United States Patent
Herigstad et al.

(10) Patent No.: US 12,076,648 B2
(45) Date of Patent: *Sep. 3, 2024

(54) SYSTEM AND METHOD FOR GENERATING AND PLAYING A THREE DIMENSIONAL GAME

(71) Applicant: Isovist Limited, London (GB)

(72) Inventors: Dale A. Herigstad, London (GB); Jack Turpin, Los Angeles, CA (US); Eric Fanghanel Santibanez, London (GB); Jeremy Alcock, Venice, CA (US)

(73) Assignee: ISOVIST LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/506,043

(22) Filed: Nov. 9, 2023

(65) Prior Publication Data

US 2024/0157254 A1    May 16, 2024

Related U.S. Application Data

(63) Continuation of application No. 18/054,743, filed on Nov. 11, 2022, now Pat. No. 11,850,523.

(51) Int. Cl.
*A63F 9/24* (2006.01)
*A63F 13/822* (2014.01)
*G06F 3/04815* (2022.01)

(52) U.S. Cl.
CPC ........ *A63F 13/822* (2014.09); *G06F 3/04815* (2013.01)

(58) Field of Classification Search
None
See application file for complete search history.

(56) References Cited

U.S. PATENT DOCUMENTS

| | | | | | |
|---|---|---|---|---|---|
| 5,312,113 | A * | 5/1994 | Ta-Hsien | ................ | A63F 13/49 463/9 |
| 6,062,978 | A * | 5/2000 | Martino | .................... | A63F 9/24 463/9 |
| 6,645,070 | B2 * | 11/2003 | Lupo | .................... | A63F 3/00094 463/9 |
| 6,746,329 | B1 * | 6/2004 | Duhamel | ............ | G07F 17/3211 273/138.2 |
| 7,749,082 | B2 * | 7/2010 | Dunaevsky | ......... | G07F 17/3211 463/31 |
| 7,785,179 | B2 * | 8/2010 | Ionescu | ................. | A63F 3/0421 463/9 |

(Continued)

OTHER PUBLICATIONS

Office Action in GB2316819.8, mailed Dec. 21, 2023, 6 pages.

*Primary Examiner* — Lawrence S Galka
(74) *Attorney, Agent, or Firm* — ARENTFOX SCHIFF LLP

(57) ABSTRACT

A method of generating an interactive three dimensional (3D) game includes generating a manipulable volumetric 3D display cube. The manipulable volumetric 3D display cube includes a plurality of cubic elements. Display data is generated to depict within the plurality of cubic elements of the manipulable volumetric virtual 3D display cube. The manipulable volumetric virtual 3D display cube is rotated along a vertical axis, in response to a first user input, to view the display data from different angles. A view of the manipulable volumetric virtual 3D display cube is changed, in response to a second user input.

20 Claims, 28 Drawing Sheets

(56) References Cited

U.S. PATENT DOCUMENTS

| | | | |
|---|---|---|---|
| 8,371,930 B1 * | 2/2013 | Saunders | G07F 17/3211 |
| | | | 463/31 |
| 8,512,138 B2 * | 8/2013 | Saunders | G07F 17/3213 |
| | | | 463/31 |
| 8,882,578 B2 * | 11/2014 | Saunders | G07F 17/3213 |
| | | | 463/19 |
| 9,005,022 B2 * | 4/2015 | Saunders | G07F 17/3213 |
| | | | 463/19 |
| 9,373,216 B2 * | 6/2016 | Trainor | G07F 17/34 |
| 2002/0111204 A1 | 8/2002 | Lupo | |
| 2003/0199293 A1 | 10/2003 | Skripachev et al. | |
| 2011/0034246 A1 | 2/2011 | Amitzur | |
| 2011/0045906 A1 | 2/2011 | Berman et al. | |
| 2011/0053675 A1 | 3/2011 | Aoki et al. | |
| 2017/0003851 A1 * | 1/2017 | Moore | G06F 3/04815 |

\* cited by examiner

SYSTEM AND METHOD FOR GENERATING AND PLAYING A THREE DIMENSIONAL GAME

CROSS REFERENCE TO RELATED APPLICATIONS

The present application is a continuation of U.S. patent application Ser. No. 18/054,743, filed Nov. 11, 2022, the entire contents of which are hereby incorporated by reference.

FIELD

The present disclosure relates generally to electronic games, and more specifically to a system and method for generating and playing a three dimensional (3D) game.

BACKGROUND

Puzzles are known for generations and they are popular with adults and kids alike because they stimulate creative thinking and provide an intellectual challenge to the player. Crossword puzzles are well known throughout the world as a constructive method of both entertainment and education. These crossword puzzles come in a wide variety of complexity and degrees of difficulty and almost every individual can find a crossword puzzle suited to their level of skill and intelligence. In this well-known puzzle type, words are placed "crosswise" with respect to other words (running sideways or running downwards), so that each word has the same letter in a given cell as the word it is crossing. Clues are used to inspire players in their search for words that fit the spaces provided and cross other words.

Computer video games have become popular entertainment options for children and adults alike. Many fantasy games have been created and many traditional games such as chess, draw poker and the like have been implemented in a computer video format. However, such video games typically keep the same format as the original game and, although often displayed in three dimensions, are generally limited to two-dimensional play on the video screen. In other words, traditional video games generally do not permit the game to be manipulated and played in three dimensions and thus do not permit the additional level of complexity possible when the games are played in three dimensions.

Virtual and augmented reality environments are generated by computers using, in part, data that describes the environment. This data may describe, for example, various objects with which a user may sense and interact with. Examples of these objects include objects that are rendered and displayed for a user to see, audio that is played for a user to hear, and tactile (or haptic) feedback for a user to feel. Users may sense and interact with the virtual and augmented reality environments through a variety of visual, auditory and tactical means.

Thus, improvements in efficient implementation of traditional games to be played and manipulated in virtual and augmented reality environments are needed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure implements traditional games on a volumetric cube displayed on a computer display screen in three dimensions. In an aspect, the volumetric display cube permits the game to be played and manipulated in three dimensions by allowing a player to manipulate the volumetric display cube to expose the respective faces during play of the game, such as, but not limited to, solving of a puzzle. Advantageously, the volumetric display cube is configured to be rendered and manipulated in virtual and augmented reality environments.

In an aspect, a method for generating an interactive three dimensional (3D) game includes generating a manipulable volumetric virtual 3D display cube. The manipulable volumetric virtual 3D display cube includes a plurality of cubic elements. Display data is generated to depict within the plurality of cubic elements of the manipulable virtual 3D display cube. The manipulable volumetric virtual 3D display cube is rotated along at least a vertical axis, in response to a first user input (manipulation), to view the display data from different angles. A view of the manipulable volumetric virtual 3D display cube is changed, in response to a second user input (zoom in or change mode).

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Those skilled in the art will readily appreciate that the description given herein with respect to those figures is for explanatory purposes only and is not intended in any way to limit the scope of the disclosure. For example, while the preferred aspect of the disclosure is described with respect to a crossword cube game, those skilled in the art will appreciate that numerous other applications, games, and the like may be implemented in three dimensions on a computer video screen in accordance with the techniques of the disclosure. Accordingly, all questions regarding the scope of the disclosure should be resolved by referring to the claims.

Turning now to the figures, example aspects are depicted with reference to one or more components described herein, where components in dashed lines may be optional.

Figure 1:
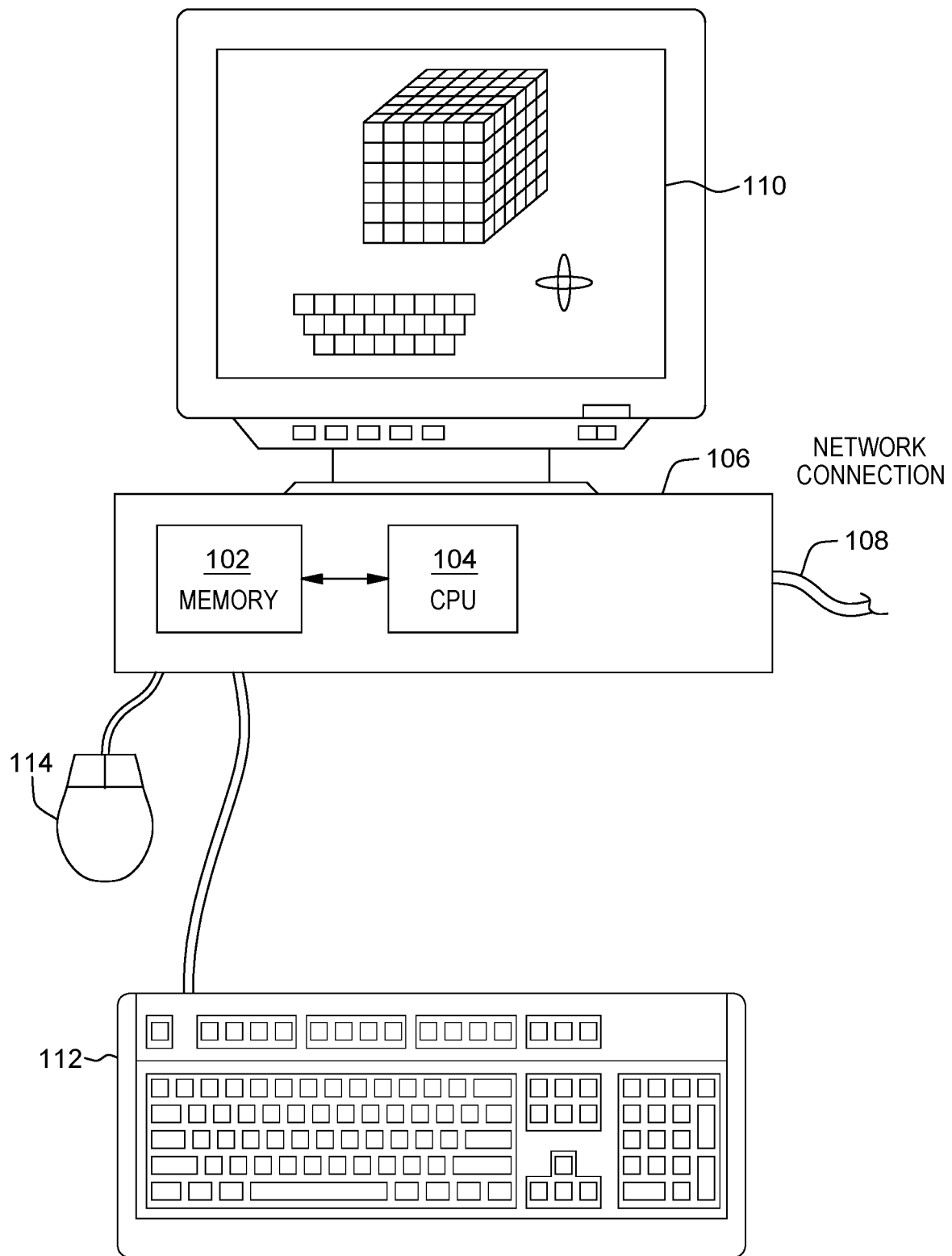
FIG. 1 illustrates a host computing device which may be connected to a computer network to receive data including game software in accordance with some present aspects.

Various aspects presented herein are preferably implemented as software containing instructions for controlling a processor, which in turn controls the display on a computing device. FIG. 1 illustrates such a computing device. It is noted that for ease of understanding the principles disclosed herein are in an example context of a stationary computing device 106, such as, but not limited to, a gaming computer with hardware supporting gaming functionality. However, the principles disclosed herein may be applied to other devices, such as, but not limited to, mobile computing devices, personal digital assistants (PDAs), media players and other similar devices capable of rendering virtual and augmented reality environments. In an aspect, software implementing the disclosure may be stored on a program storage device 102 readable by a processor 104 of computing device 106 whereby the program of instructions stored thereon is executable by the processor 104 to perform the method steps illustrated in FIG. 15, for example. The game software may be provided in digital form on a computer readable medium, or may otherwise be transmitted to the host computing device 106 in digital form over a network connection 108 and loaded into the computing device's memory 102. In an aspect, the game software may be configured to be executed in a play mode or a creator mode.

During creation of the crossword puzzle, the game software may be loaded on the memory 102 of the host computing device 106 in the creator mode, the game's graphics images are displayed on a video display 110, and creation of the crossword puzzle is controlled by user entries via keyboard 112 and mouse 114. Some computing devices 106 such as laptop computers, may include a trackpad or touchpad (not shown in FIG. 1) that can be used in place of or in addition to the mouse 114 to maneuver a cursor on a computer screen, or to trigger one or more functions of the computing device 106. Such trackpads or touchpads can be coupled to, or integrated within, the computing device 106. A touchpad (also referred to herein interchangeably as a trackpad) is a navigating device featuring a tactile sensor, which is a specialized surface that can translate the motion and position of a user's fingers to a relative position on screen and/or within a virtual/augmented reality environment. Touchpads are a feature of laptop computers or mobile devices, and are also used as a substitute for a mouse, for example where desk space is scarce. Because they vary in size, they may also be found on personal digital assistants and portable media players. Wired or wireless touchpads are also available as accessories. By integrating multi-touch input capability into the touchpad and/or touchscreen without altering its overall appearance or, more importantly, the familiar way in which it is used for interacting with a computing device, many of the benefits of multi-touch gesture-based input capability can be realized without having any negative impact on the user's interactive experience. Additionally, same interaction layouts may be shown both on a touchscreen and in virtual and augmented reality environments.

During play of the game, the game software may be loaded on the memory 102 of the host computing device 106 in the game mode, the game's graphics images are displayed on a video display 110, and play of the game is controlled by user entries via touchscreen (as described below) and/or via keyboard 112 and mouse 114.

The computing device 106 may operate in a networked environment supporting connections to one or more remote computers, such as client devices. The network connection 108 depicted in FIG. 1 may include a local area network (LAN) and a wide area network (WAN), but may also include other networks. When used in a LAN networking environment, computing device 106 may be connected to the LAN through a network interface or adapter. When used in a WAN networking environment, computing device 106 may include a wide area network interface for establishing communications over the WAN, such as the Internet. It will be appreciated that the network connections shown are illustrative and other means of establishing a communications link between the computers may be used. In an aspect, the computing device 106 may also comprise a mobile terminal, including, but not limited to, a mobile phone, smartphone, tablet computer, personal digital assistant (PDA), notebook, and the like, which may include various other components, such as, but not limited to a battery, speaker, and antennas (not shown).

Figure 2A:
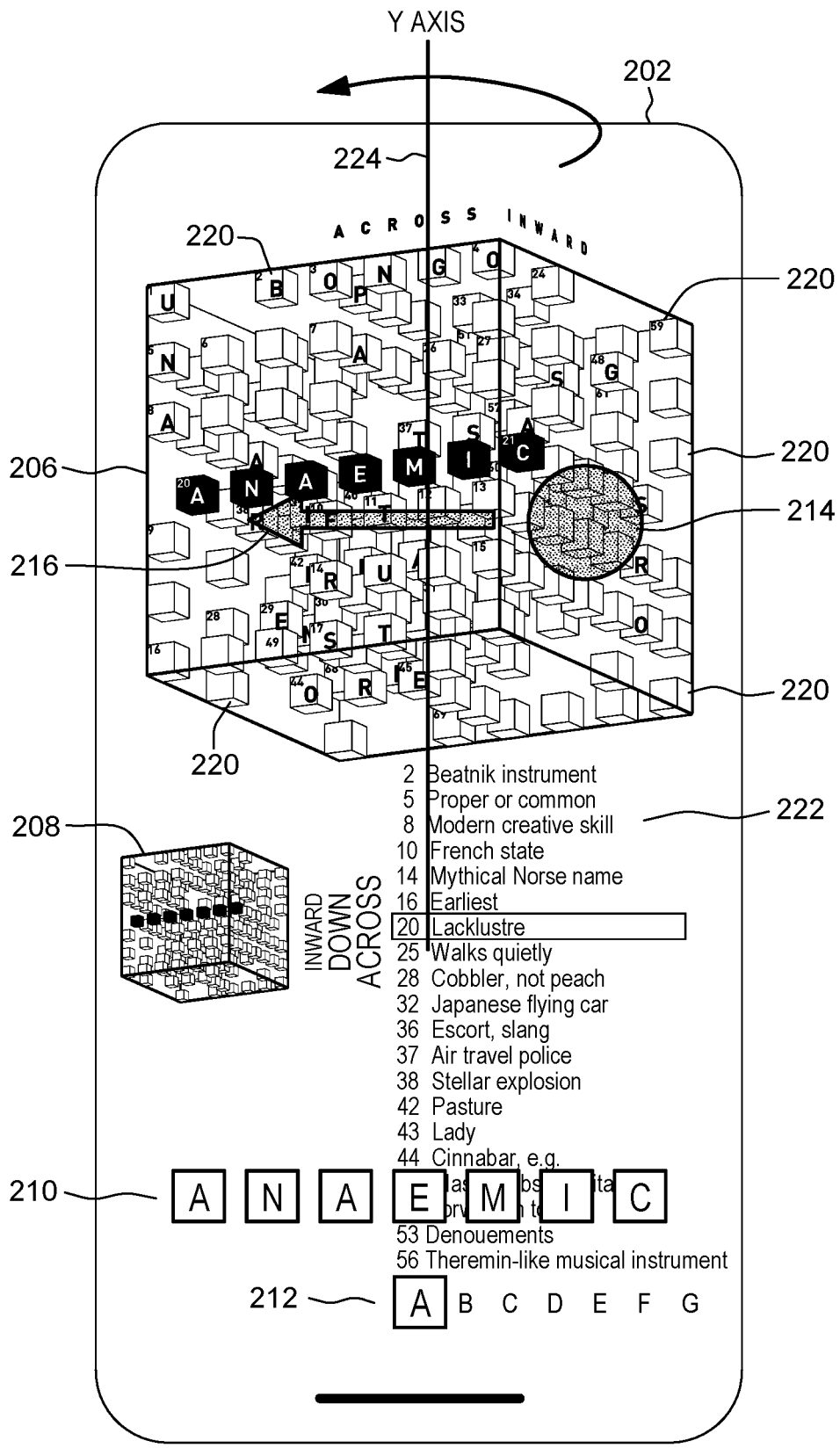
FIGS. 2A-4B illustrate manipulation of a display cube as displayed on a mobile device screen according to some present aspects.
Figure 2B:
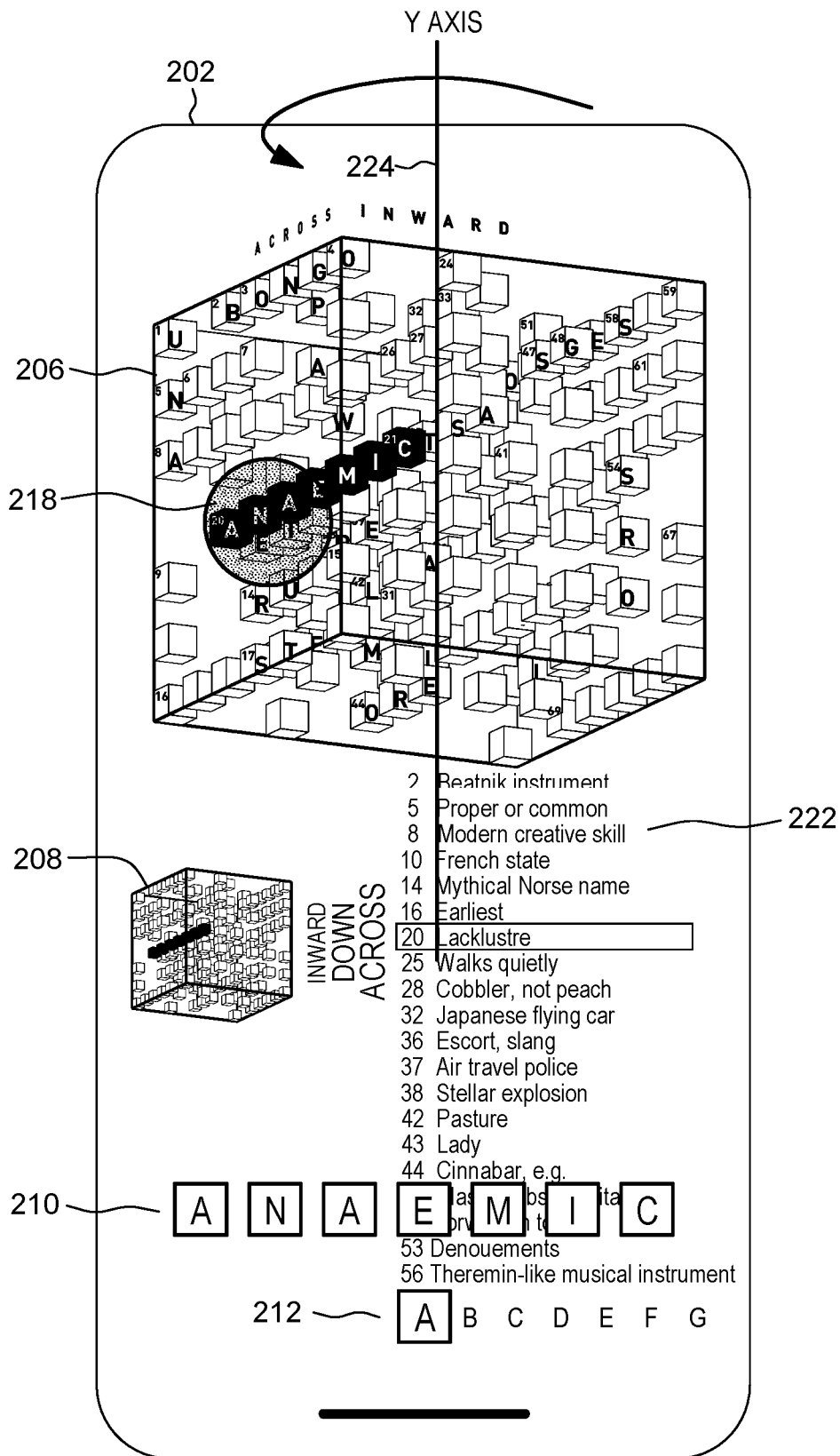

FIGS. 2A and 2B illustrate manipulation of a crossword cube game as displayed on a mobile device screen according to some present aspects. As illustrated, the crossword puzzle game may be implemented on a manipulable volumetric virtual 3D display cube 206 rendered on a screen of the computing device 106. In an aspect, the manipulable volumetric virtual 3D display cube 206 may include a plurality of cubic elements. In one non-limiting example, the display cube 206 may include 343 (7×7×7) cubic elements. If it is desirable to use a simplified version of the game, the display cube 206 may include 125 (5×5×5) cubic elements instead. Advantageously, the complexity of the game may be increased/reduced within reasonable limits by increasing/reducing the number of cubic elements in the display cube 206. In an aspect, the display cube 206 may be dynamically rotated and manipulated by a user, for example, using a mouse 114. If the computing device 106 is a mobile device, the display 202 of the mobile device may be a touchscreen display. Touchscreen displays enable a user to view information on a mobile device's display, while also enabling the user to provide inputs, issue commands, launch applications, manipulate displayed object, etc. using the same display as an input.

FIG. 2A also illustrates a Display Cube Mode Selector (DCMS) icon 208, a clue list 222, a word builder 210 and a letter selector 212. In an aspect, a user may switch between a plurality of game viewing modes by tapping on the DCMS icon 208. In an aspect, a first viewing mode may render all played crossword puzzle words and all potential input tiles (cubic elements) 220. In an aspect, the processor 104 may generate a geometry buffer for storing the x, y, z values of each input tile 220. A second viewing mode may render only the selected word and all words that intersect the selected word. In an aspect, a third viewing mode may render a slice of a particular surface of the 3D display cube 206 and may render all the words included in the rendered slice. In an aspect, the word builder 210 and the letter selector 212 may be rendered at the bottom of the touch screen 202, as shown in FIG. 2A.

In an aspect, the processor 104 may receive or detect an event associated with moving the display cube 206. The event may be a touch, a gesture, a proximity or hovering input using an electronic pen or a part of user's body, etc. For example, while the display cube 206 is displayed on the touch screen 202, the event may be generated by moving the display cube 206 upwards, downwards, rightwards, or leftwards and releasing after touching the screen 202.

In an aspect, the display cube 206 may be rendered in either a "look up at" (display cube) or a "look down at" positions. FIG. 2A shows the default and optimum viewing position, which is "look up at" the display cube 206. In an aspect, a user may perform a touch and tilt down operation to look downward at the display cube 206. Similarly, a user may perform a touch and tilt up operation to look upward at the display cube 206, when the display cube 206 is rendered in "look down at" position. In an aspect, a user may perform a double tap operation by double tapping any surface of the display cube 206 and a mapping function (e.g., zoom in/out to/from a selected word) corresponding to the selected surface may be performed dynamically by the processor 104 in response to user's input (double tap).

In addition, a user may rotate the display cube 206 left/right around vertical axis at any time while playing. In an aspect, the display cube 206 may dynamically rotate around a vertical axis 224. In an aspect, the processor 104 may utilize rotational limit positions on each side, so that rotation of the display cube 206 may be stopped to prevent the display cube 206 from rendering words of the cross word puzzle backwards and/or from rendering words in a stacked up fashion. In an aspect, the rotational limit position may be set at 28 degrees left or right with respect to the starting position. In an aspect, the default and optimum viewing position may render the display cube 206 rotated to the user at a 45-degree angle in such a way that overlap of both front and back edges of the display cube 206 is visible to user. It should be noted, that in various implementations other rotational limits may be used to improve readability of the data rendered by the display cube 206. The display cube 206 in FIG. 2A illustrates an exemplary original position of the display cube 206. In an aspect, a user may touch 214 any surface of the display cube 206 and may move the display cube 206 towards either left or right side of the screen around the vertical axis 224, depending on a desired position. The display cube 206 in FIG. 2B illustrates an exemplary position of the display cube 206 after completion 218 of the leftward rotation operation 216. It should be noted that a user may stop the desired rotation at any point (as long as the game cube 206 does not move beyond the rotational limit positions) by releasing the display cube 206.

The touch screen 202 may use LCD (liquid crystal display) technology, or LPD (light emitting polymer display) technology, although other display technologies may be used in other aspects. The touch screen 202 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch screen 202.

Figure 3A:
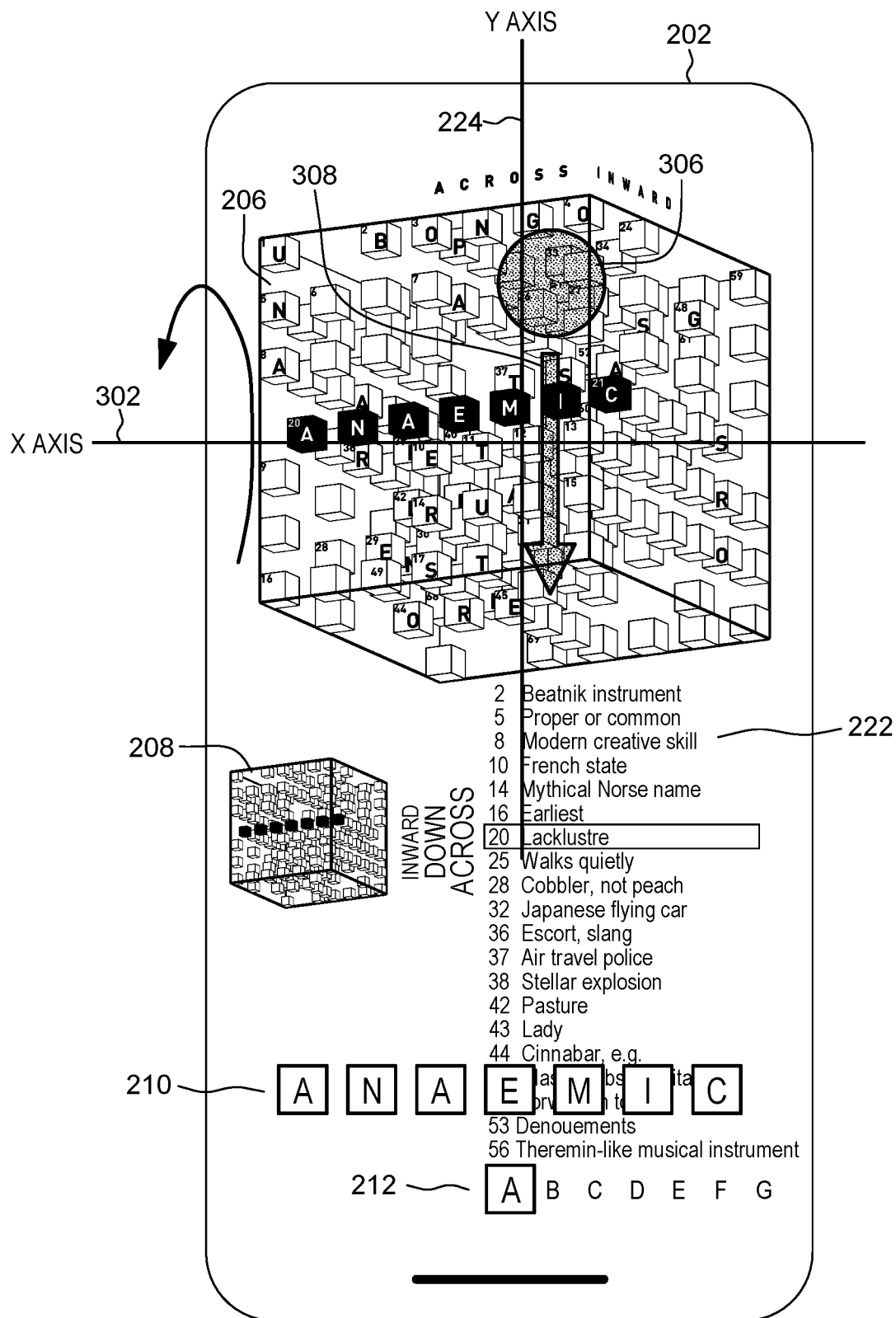
Figure 3B:
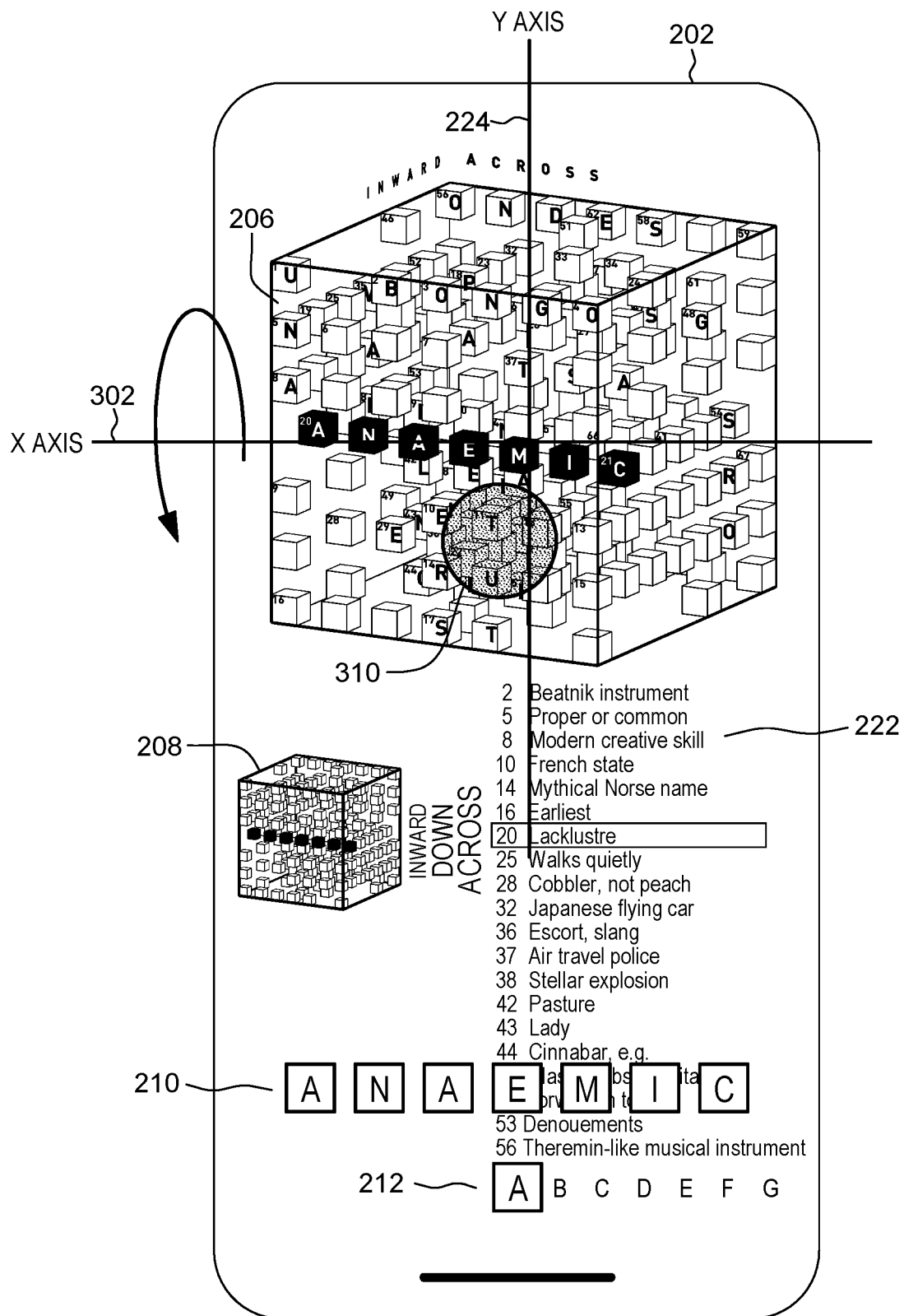

FIGS. 3A and 3B illustrate an exemplary dynamic touch and tilt operation. FIG. 3A illustrates an exemplary original position of the display cube 206. In an aspect, a user may touch 306 any surface of the display cube 206 and may rotate the display cube 206 upwards or downwards around a horizontal axis 302, depending on a desired position. In an aspect, the display cube 206 may be rendered in either a "look up at" (display cube) or a "look down at" positions. FIG. 3B illustrates an exemplary position of the display cube 206 after completion 310 of the downward tilt operation 308 around the horizontal axis 302. In other words, FIG. 3A illustrates the "look up at" position and FIG. 3B illustrates the "look down at" position of the display cube 206. In an aspect, the display cube 206 may be viewed exclusively in the shown positions during the upwards and/or downwards rotation around the horizontal axis 302. In an aspect, the view shown in FIG. 3A may be default view 302 enabling a user to look up at the display cube 206.

Figure 4A:
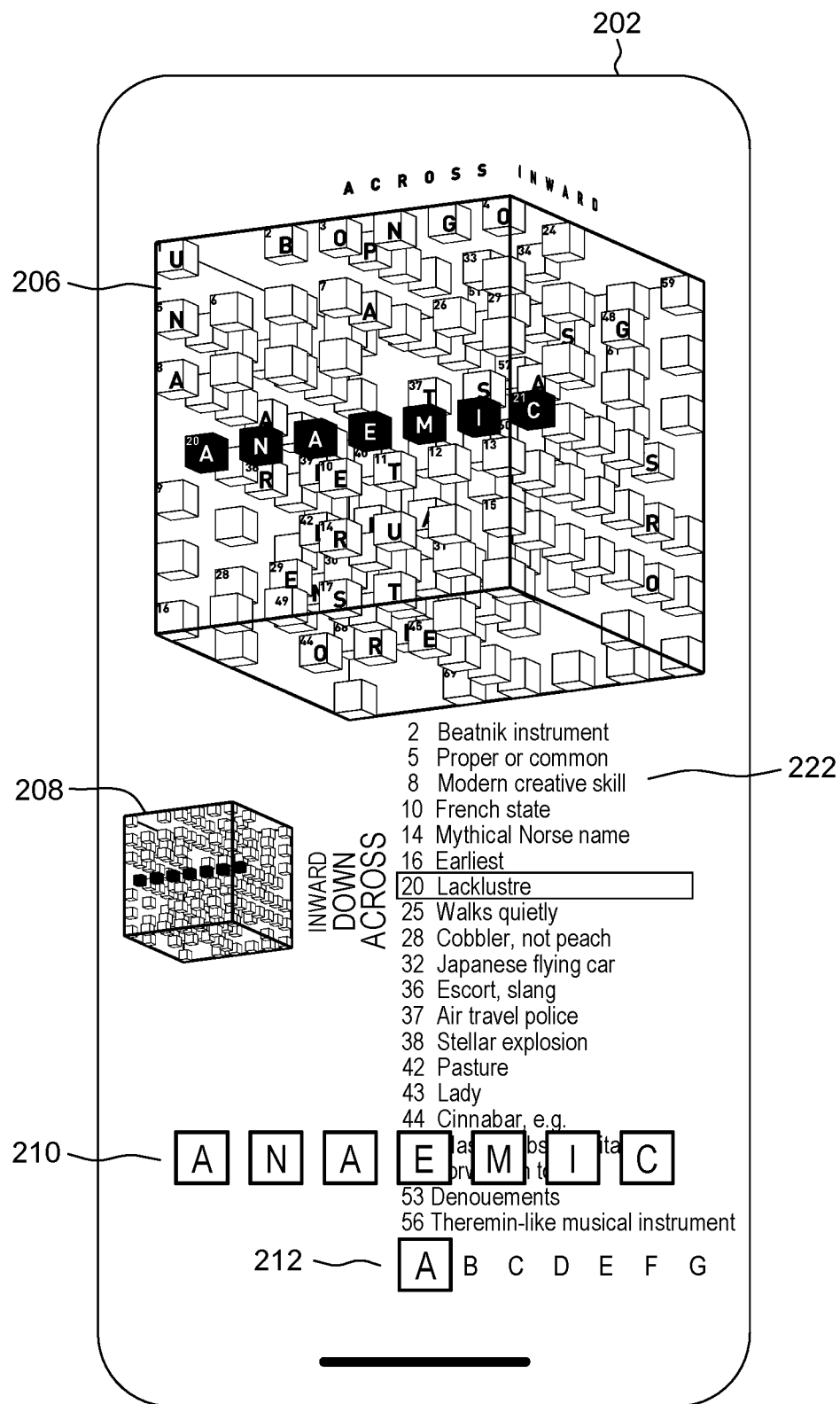
Figure 4B:
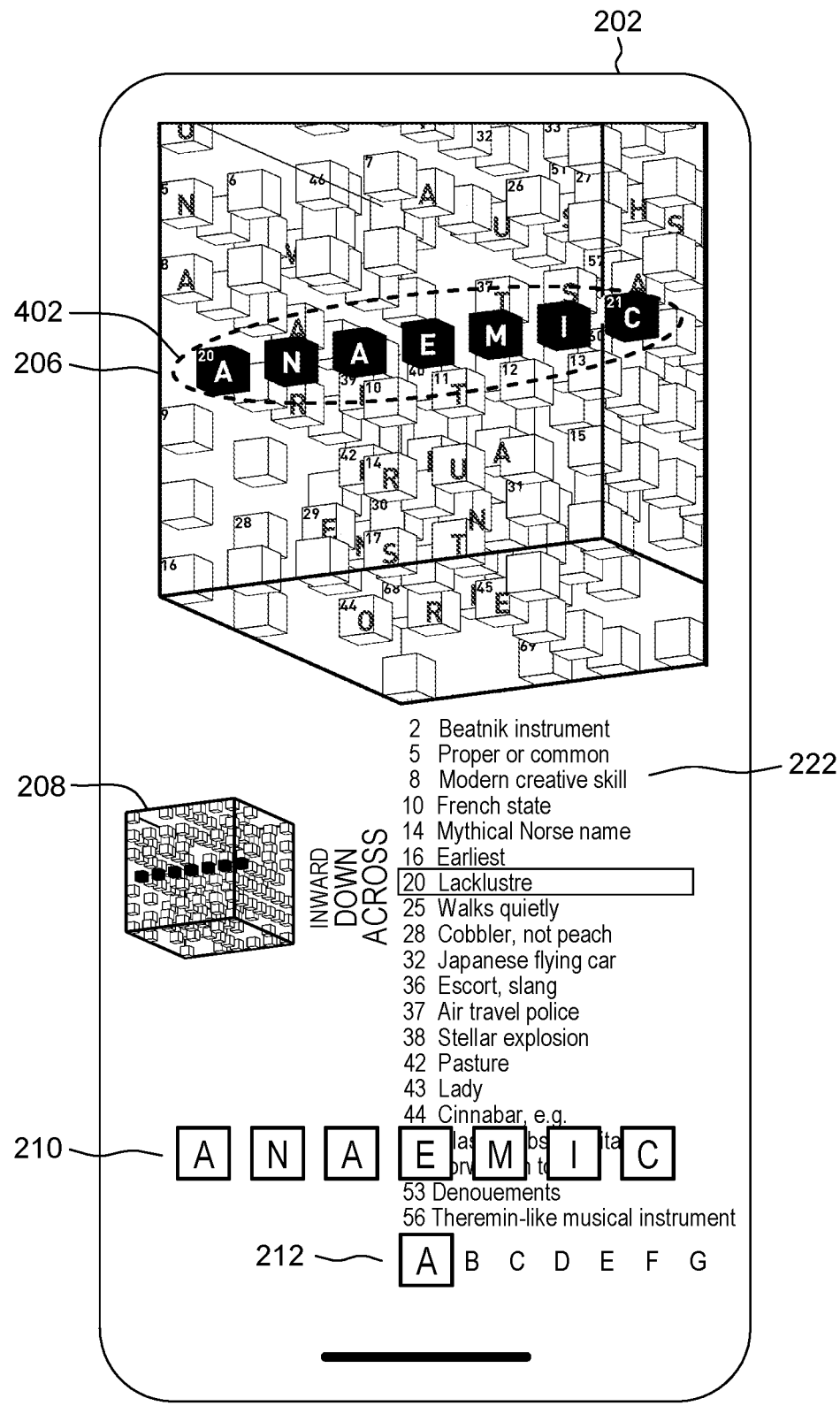

As noted above, a user may dynamically perform a double tap operation by double tapping any surface of the display cube 206. In response to such input, a mapping function (e.g., zoom in/out to/from a selected word) corresponding to the selected surface may be performed by the processor 104 in real time. FIG. 4A illustrates an exemplary original position (default view) of the display cube 206. In an aspect, a user may double tap any surface of the display cube 206 to zoom in to a closer view. In an aspect, in response to detecting a double tap operation, the processor 104 may automatically generate a view of the display cube 206 shown in FIG. 4B. The view shown in FIG. 4B includes a subset of information shown in FIG. 4A that is more focused or zoomed-in. For example, the processor 104 may place the selected word 402 in the center of the closer view shown in FIG. 4B. In an aspect, in response to detecting another double tap operation, the processor 104 may dynamically return to the full default view (shown in FIG. 4A) of the display cube 206.

FIGS. 5A-7B illustrate a viewing mode selector, according to some present aspects. As noted above, a user may dynamically switch between different modes of viewing by tapping on the DCMS icon 208.

Figure 5A:
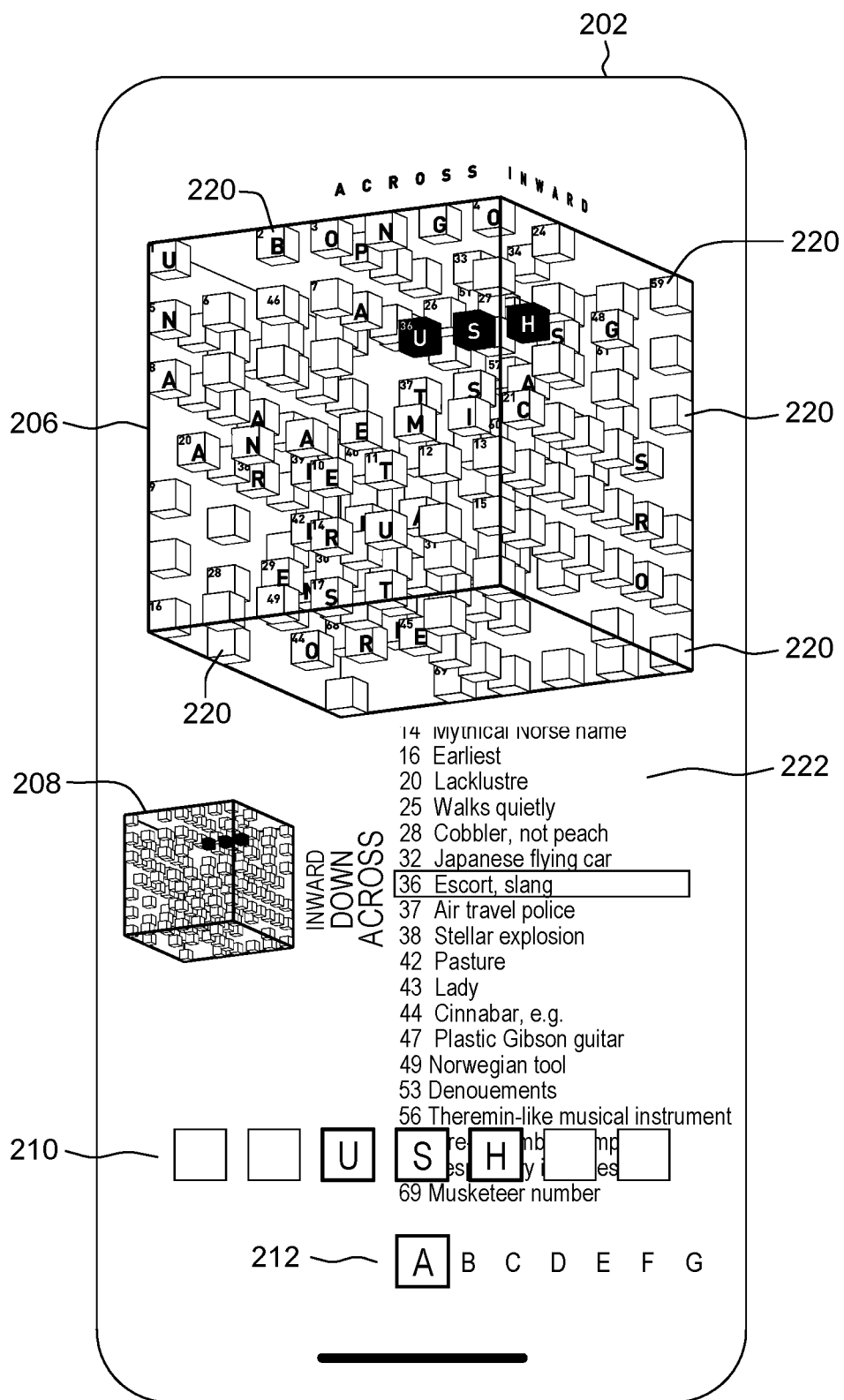
FIGS. 5A-6C illustrate different modes of viewing of the displayed cube game as displayed on a mobile device screen according to some present aspects.
Figure 5B:
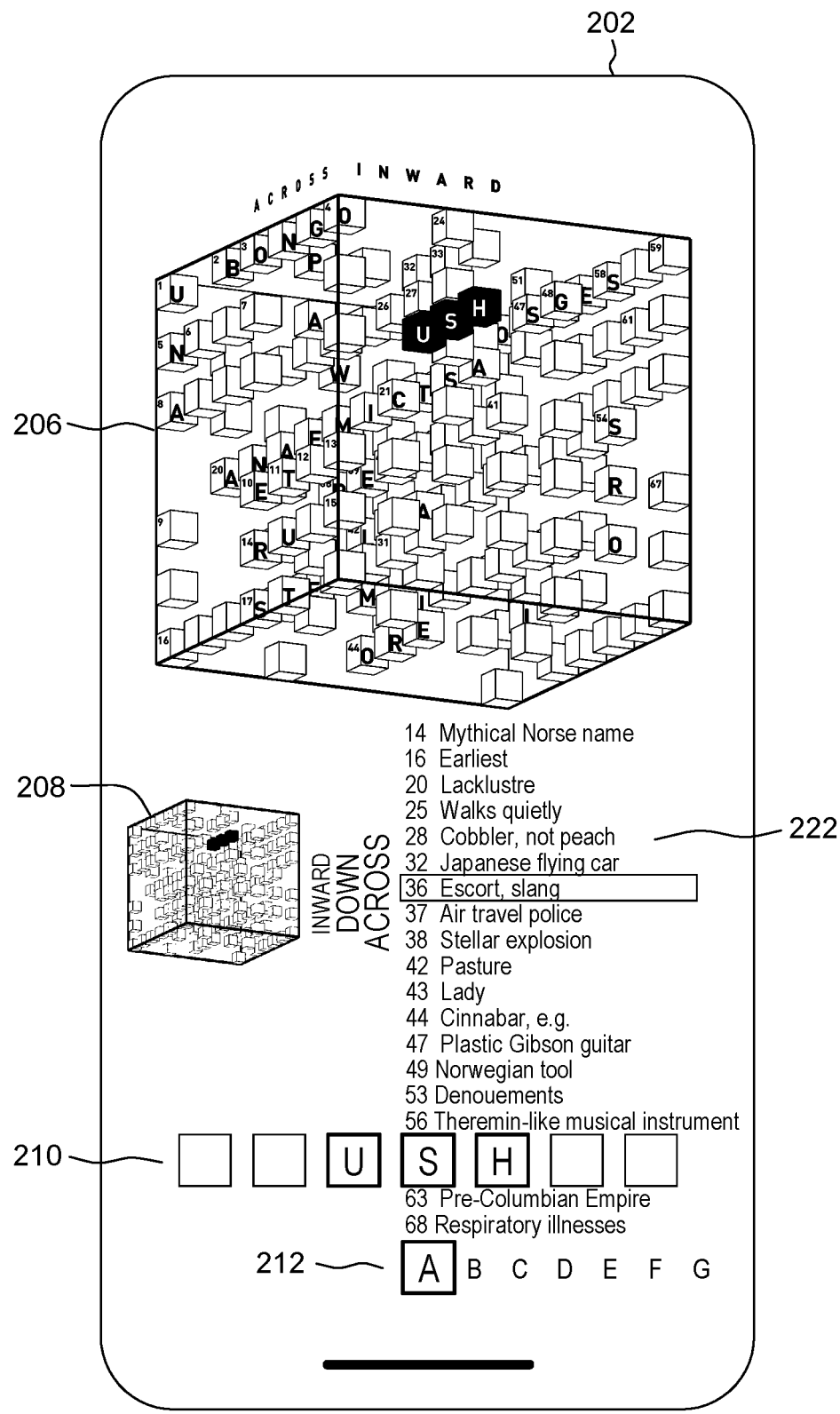

FIGS. 5A and 5B illustrate rotation of the DCMS icon 208. In an aspect, a first (default) mode may render a complete view of all potential input tiles 220, as illustrated in FIG. 5A. Various combinations of the input tiles (cubic elements) 220 represent various word positions of the crossword puzzle. By rotating the view of the display cube 206 rendered in the first mode either rightwards or leftwards around the vertical axis 224 (shown in FIG. 2A), as described above, a user may get a better sense of a three dimensional position of each word within the display cube 206. It should be noted that when the display cube 206 is rotated, all of the input tiles 220 are dynamically rotated as well to match the rotation of the display cube 206. Advantageously, rotating the display cube 206 left/right by even minimal amounts may create parallaxes in the plurality of cubic input tiles 220, enhancing the sense of 3D space, and/or clarifying positions of individual input tiles 220 as being in front of, or behind other objects, for example. In an aspect, the DCMS icon 208 may rotate in the same direction in 3D around the vertical axis 224 as the display cube 206. For example, FIG. 5A illustrates a default position of the display cube 206 and a default view of the DCMS icon 208. In response to the rotation of the display cube 206 to the position shown in FIG. 5B, the processor 104 may dynamically rotate the default view of the DCMS icon 208 such that the rotation of the display cube 206 in 3D around the vertical axis 224 matches the rotation of the DCMS icon 208.

Figure 6A:
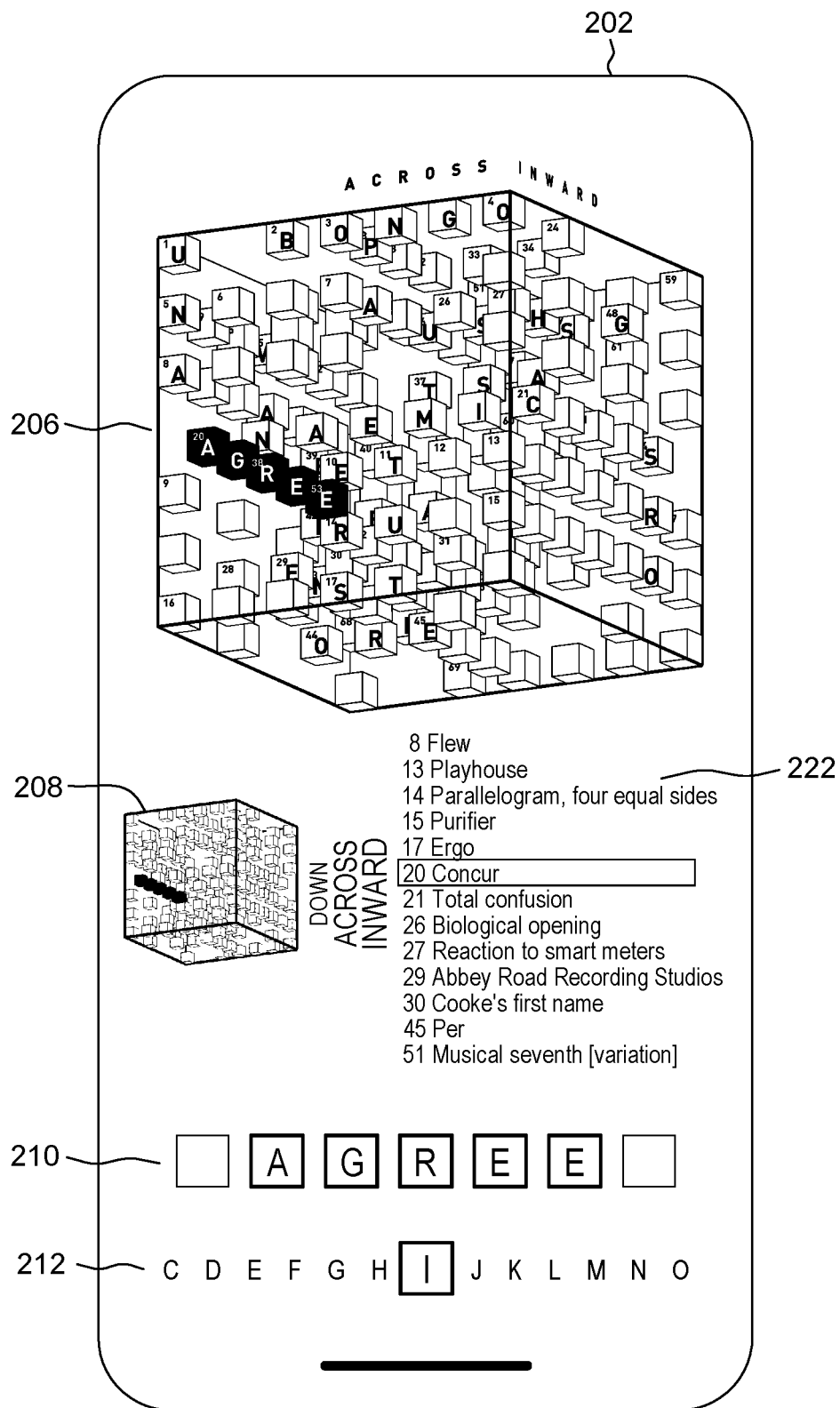
Figure 6B:
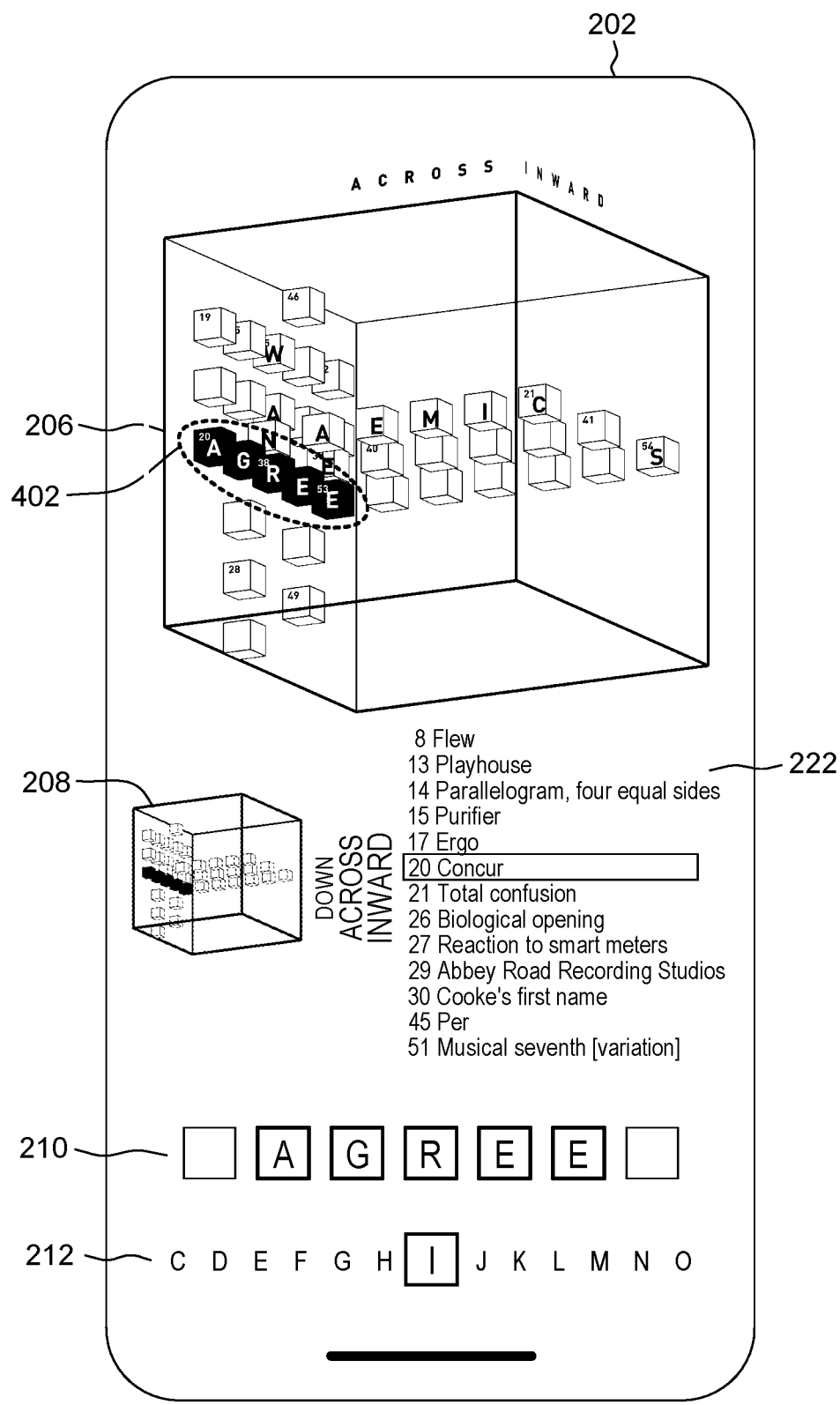
Figure 6C:
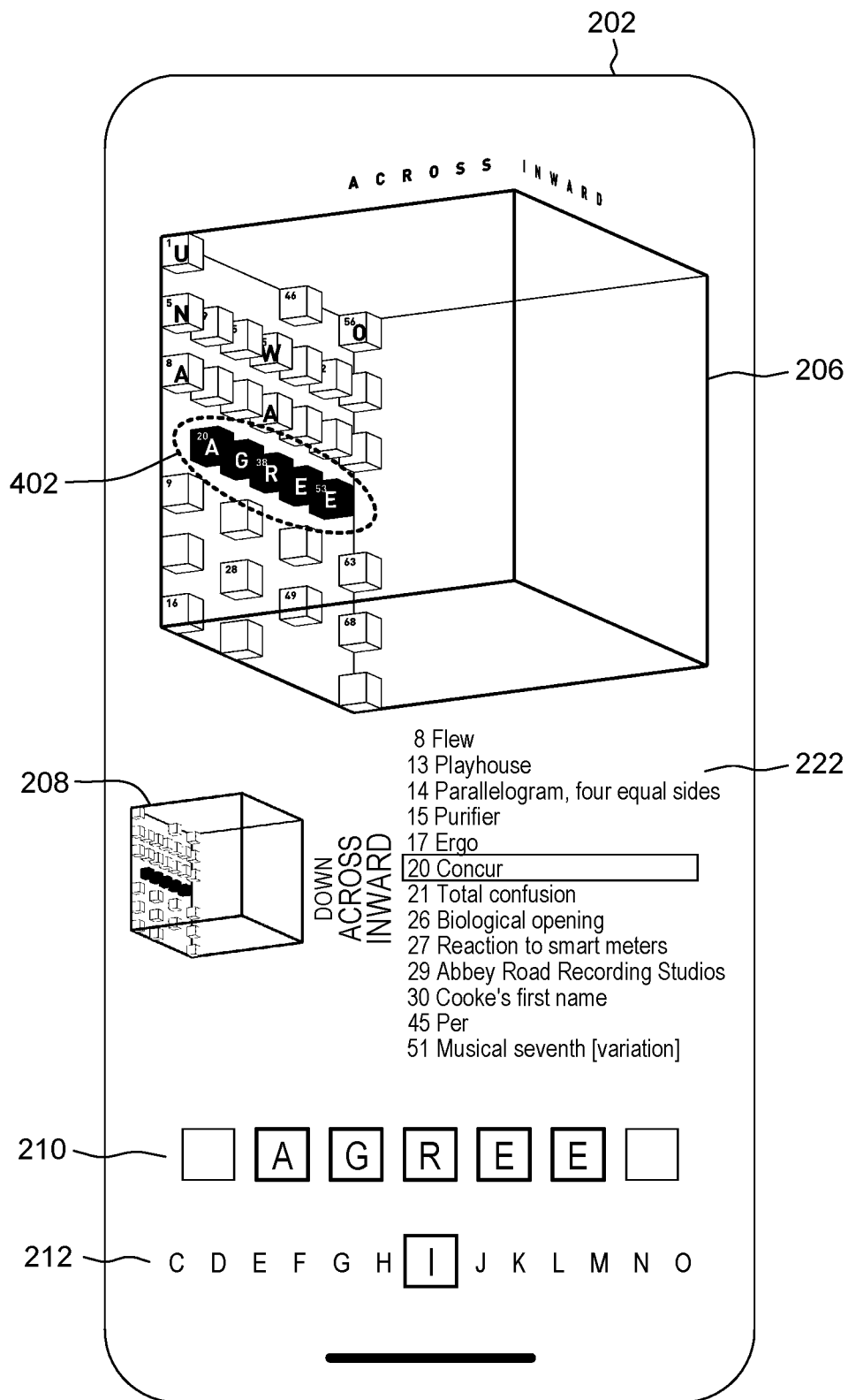

FIGS. 6A-6C illustrate three exemplary viewing modes of the display cube 206. More specifically, FIG. 6A illustrates the first (default) mode described above in conjunction with FIG. 5A. FIG. 6B illustrates a second mode of viewing the display cube 206 and FIG. 6C illustrates a third mode of viewing the display cube 206.

In an aspect, in response to user tapping the DCMS icon 208, the processor 104 may dynamically render the display cube 206 in the second mode of viewing, as shown in FIG. 6B. In the second mode illustrated in FIG. 6B, the processor 104 may determine and selectively display only connected words 602 that share letters with the selected word 402. It should be noted that the connected words 602 could be from any surface of the 3D display cube 206, as long as they share letters with the selected word 402 on one of the surfaces.

In an aspect, in response to user tapping the DCMS icon 208 one more time, the processor 104 may dynamically render the display cube 206 in the third mode of viewing, as shown in FIG. 6C. In an aspect, the third viewing mode may render a slice 604 of a particular surface of the display cube 206 and may render all the words included in the displayed slice 604. In other words, in the third view shown in FIG. 6C, the processor 104 may determine and display not only the connected words 602 that share letters with the selected word 402, but also all other words that are located in the same slice 604 of a particular surface of the display cube 206. Advantageously, the second and third modes of viewing the display cube 206 may help a user to see only a subset of words rendered by the display cube 206.

Figure 7A:
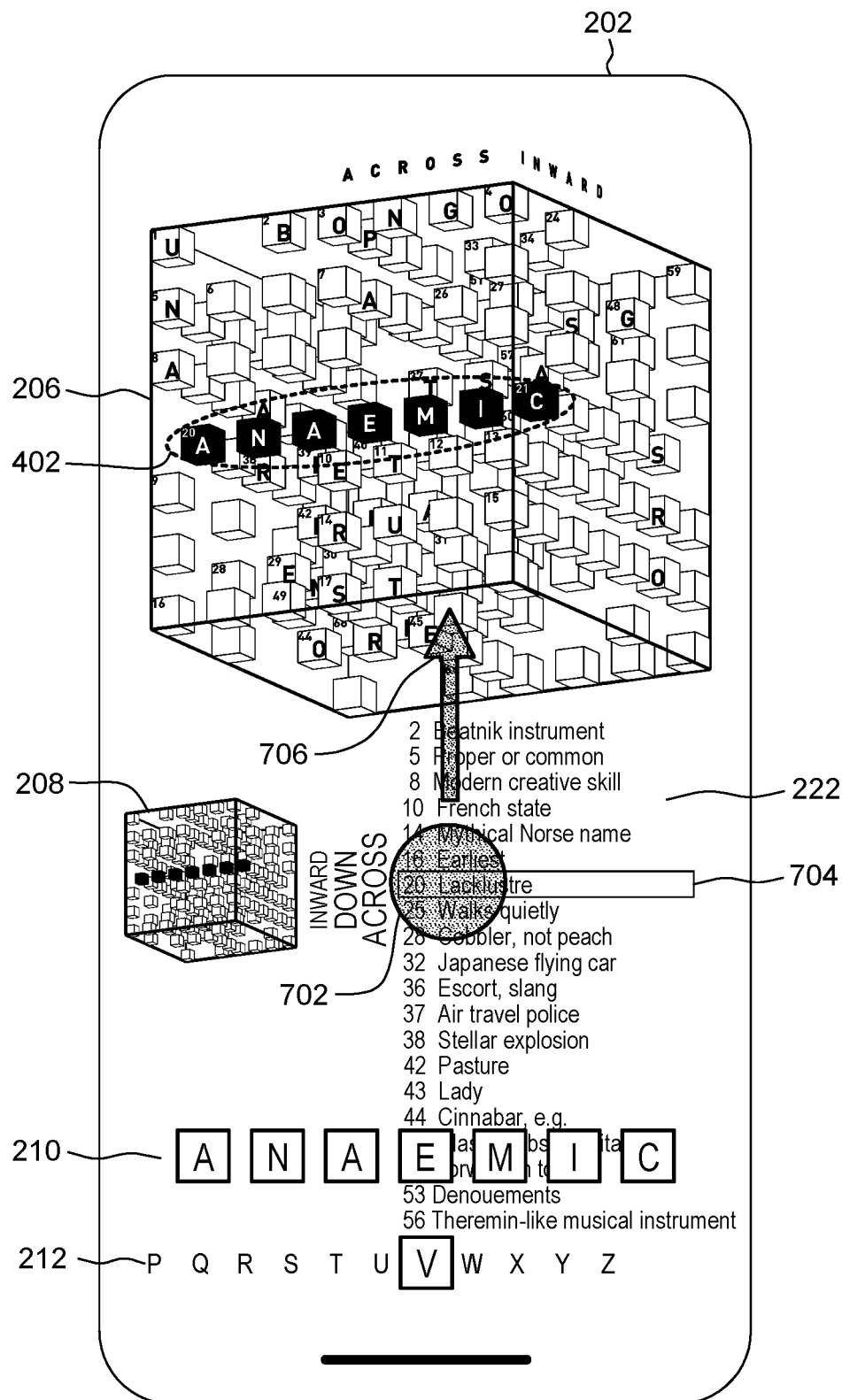
FIGS. 7A-8C illustrate navigation of crossword clue lists according to some present aspects.

FIGS. 7A-8B illustrate navigation of crossword clue lists 222 according to some present aspects. In an aspect, by default, the processor 104 may render the clues in the clue list 222 for the side of display cube 206 facing the user. As shown in FIG. 7A, a user may move the clue list 222 to another word position by touching 702 the highlight rectangle 704 and moving it up 706 or down along the y-axis of the display cube 206. It should be noted that the selected word 402 in the display cube 206 corresponds to the clue selected by the highlight rectangle 704.

Figure 7B:
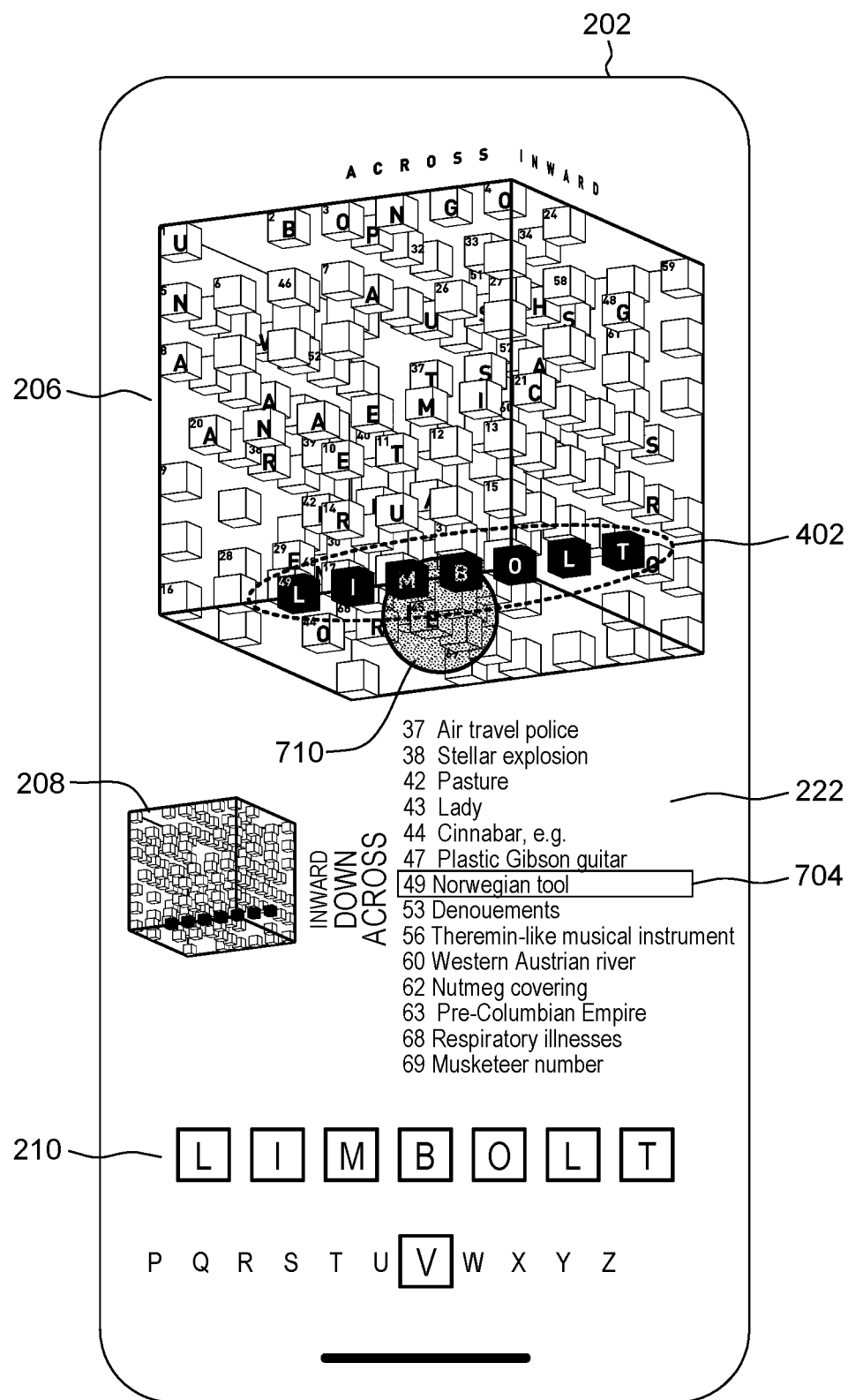

In an aspect, in response to detecting any navigation of the clue list 222 by a user, the processor 104 may automatically disable any manipulation of the display cube 206. This functionality may enable a user to navigate the clue list 222 by touching 710 over the display cube 206 area, as shown in FIG. 7B. FIG. 7B further illustrates a new clue selected by a user via the rectangle 804. In an aspect, in response to the newly selected clue in the clue list 222, the processor 104 may dynamically change the selected word 402 in the display cube 206. In other words, the selected word 402 in the display cube 206 always corresponds to the selected clue in the clue list 222.

In an aspect, the clues included in the clue list 222 may be color coded by the processor 104. For example, clues corresponding to the words that have been completed by a user may automatically turn orange in the clue list 222. Color coded information such as, but not limited to, color coded clue list 222 may be useful to a user towards the end of the puzzle completion. For example, uncompleted words may be more apparent to a user if the corresponding clues are color coded in the clue list 222.

Figure 8A:
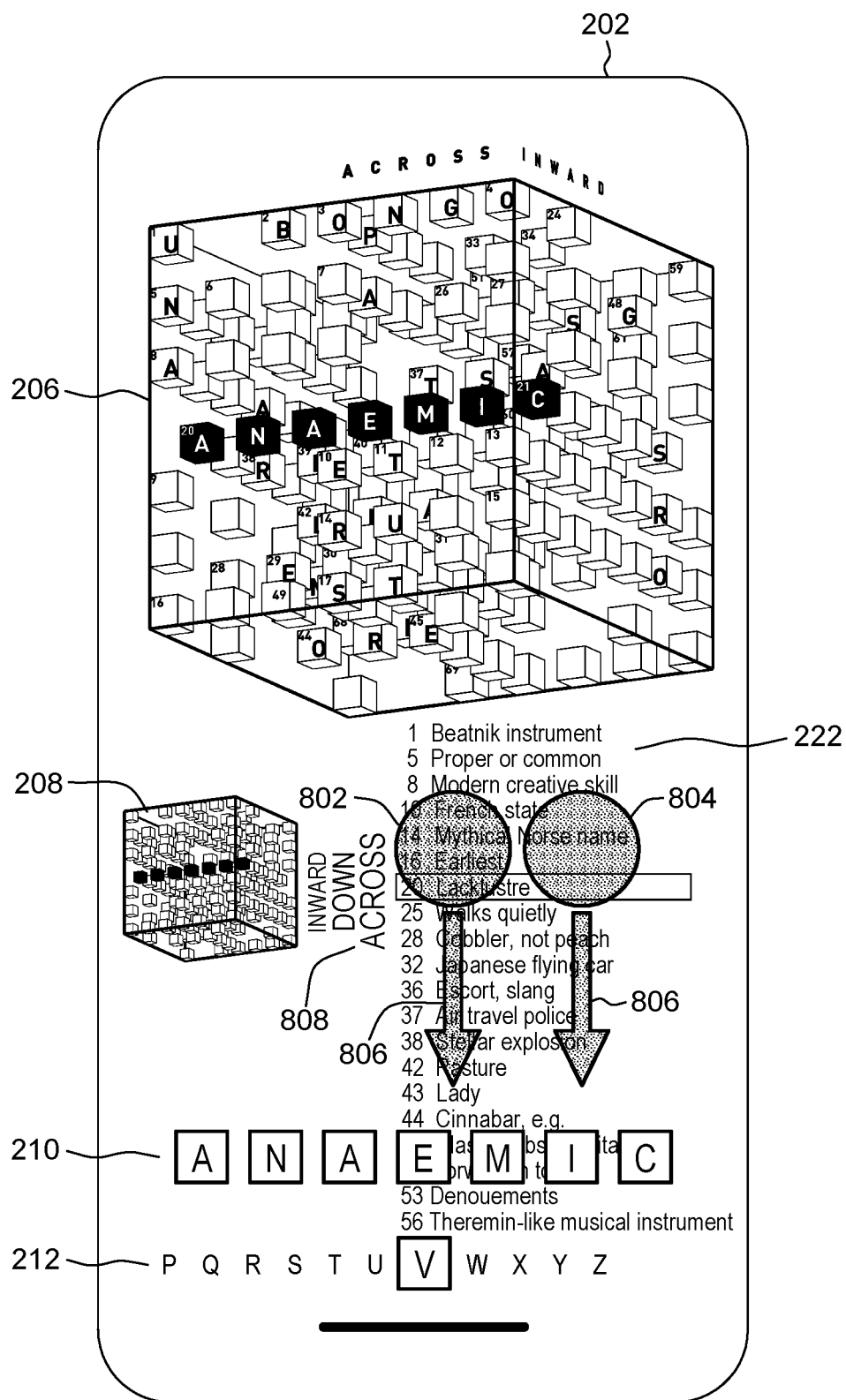
Figure 8B:
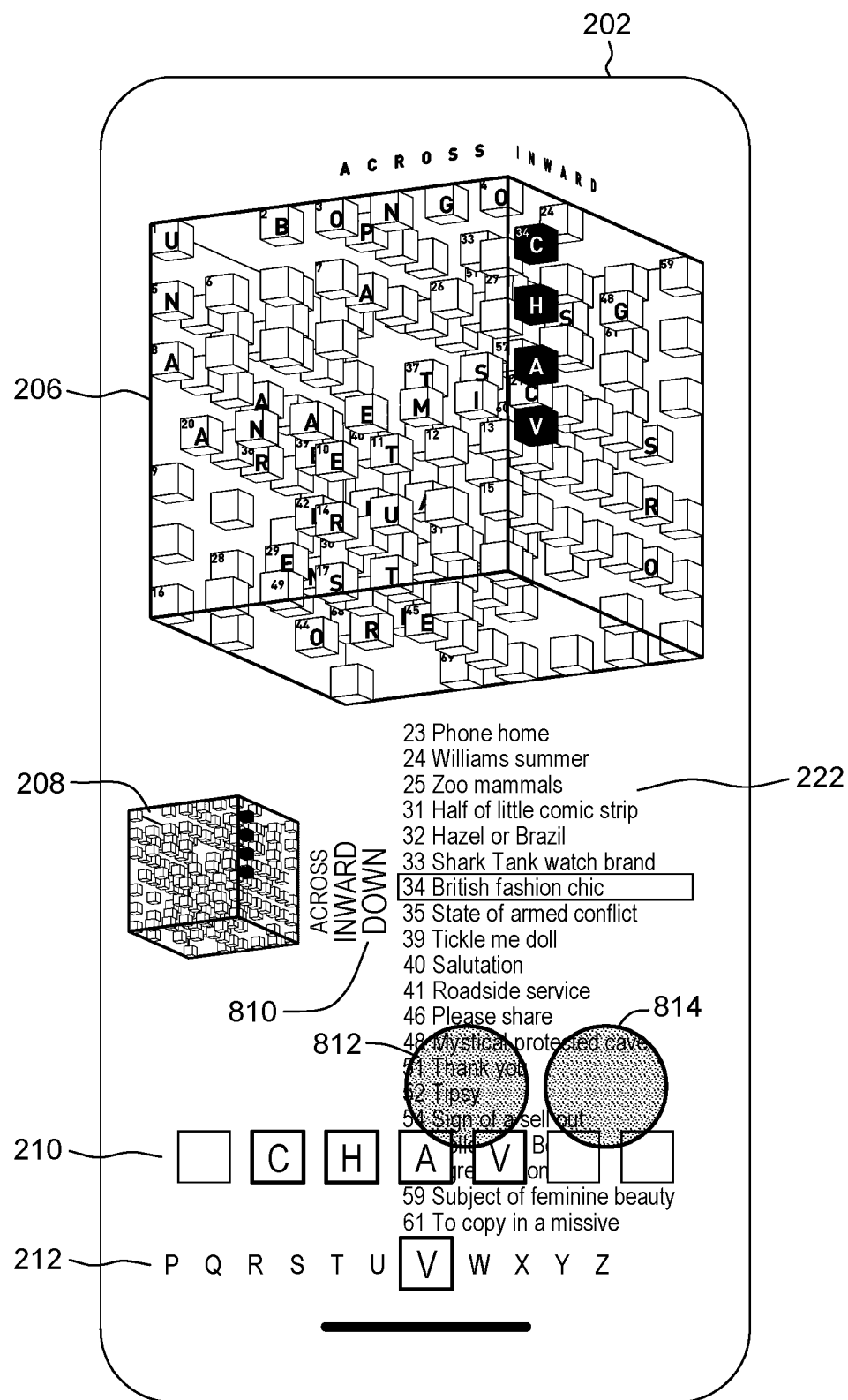
Figure 8C:
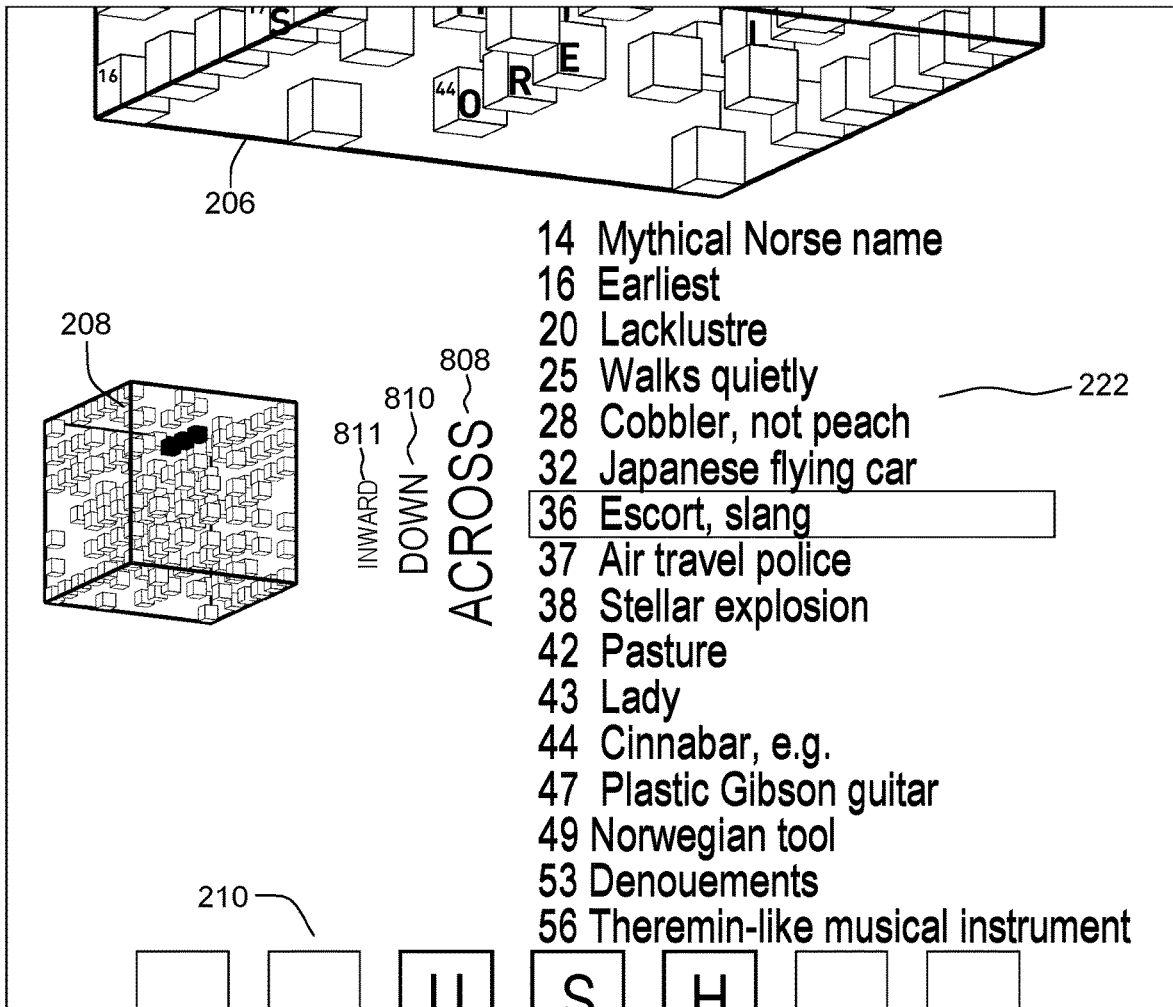

FIGS. 8A-8C illustrate navigation of crossword clue lists 222 in different directions. In an aspect, each axis of the display cube 206 may represent a particular direction (e.g., across, down and inward directions) of a crossword puzzle. Advantageously, a user may switch the directions of the clue list 222 by swiping two fingers. In an aspect, in response to detecting a touch input, the processor 104 may wait for a predetermined period of time (e.g., a few milliseconds) to check whether a second touch input is detected. In response to detecting the second touch input, the processor 104 may switch the directions of the clue list 222. Such touches 802 and 804 of two fingers are shown in FIG. 8A. The clue list 222 displayed in FIG. 8A corresponds to an across direction 808 of the crossword puzzle. In an aspect, in response to detecting a two finger swipe in the clue list 222 area, the processor 104 may dynamically display the clue list 222 corresponding to a down direction 810 of the crossword puzzle, as shown in FIG. 8B. In an aspect, swiping two fingers 802 and 804 downward 806 to the exemplary positions 812 and 814 shown in FIG. 8B may bring the next direction of the crossword puzzle to the forefront. In contrast, by swiping two fingers 812 and 814 upward, a user may bring the current direction (e.g., down direction 810) to the back. In other words, the processor 104 may be configured to dynamically cycle through the aforementioned directions of the crossword puzzle, in response to user swiping (up or down) and may change the clue list 222 according to user's motions. In an aspect, the processor 104 may use an array list for storing each of the clue lists 222. Furthermore, the clue lists 222 may be arranged front to back in 3 dimensional space facilitating dynamic cycle through process described above by moving the focus to the corresponding clue list 222 forward or backward within the 3 dimensional space (along the Z-axis), for example, in a carousel fashion. FIG. 8C is a blown up view of an exemplary array list of clue lists. Each of the clue lists 222 arranged front to back within the three dimensional space may be virtually attached to the objects representing across 808, down 810 and inward 811 directions. In some aspects, the clue lists 222 may be displayed in different pre-defined areas of the display, for example, on the left side of the display. Advantageously, such arrangement may also enhance the sense of 3D space for a user. Furthermore, the functionality illustrated in FIGS. 8A-8C (processing of user's two finger gesture) enable a user to navigate crossword clue lists in all 3 dimensions.

Figure 9A:
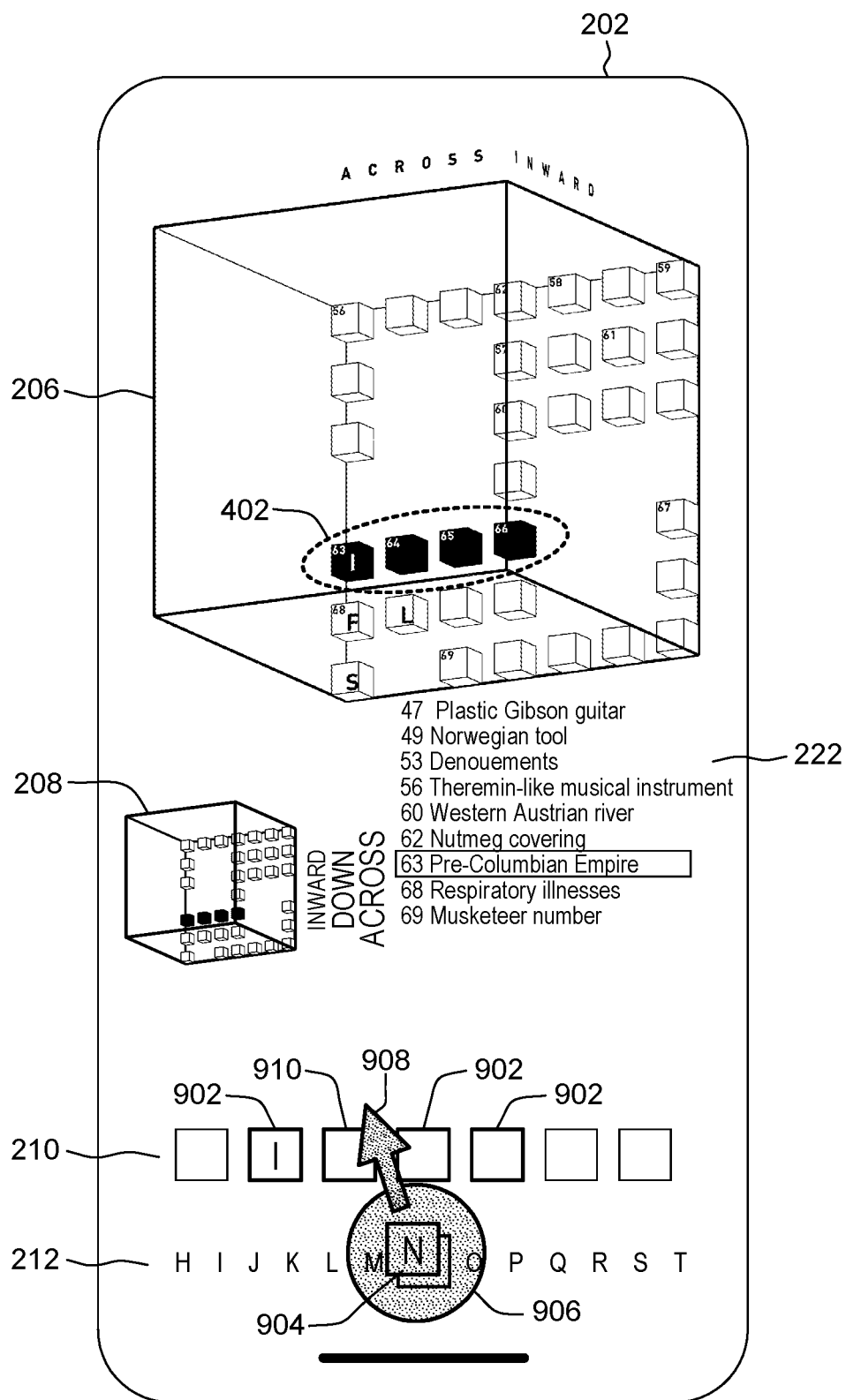
FIGS. 9A and 9B illustrates the process of placing letters in a word builder according to some present aspects.
Figure 9B:
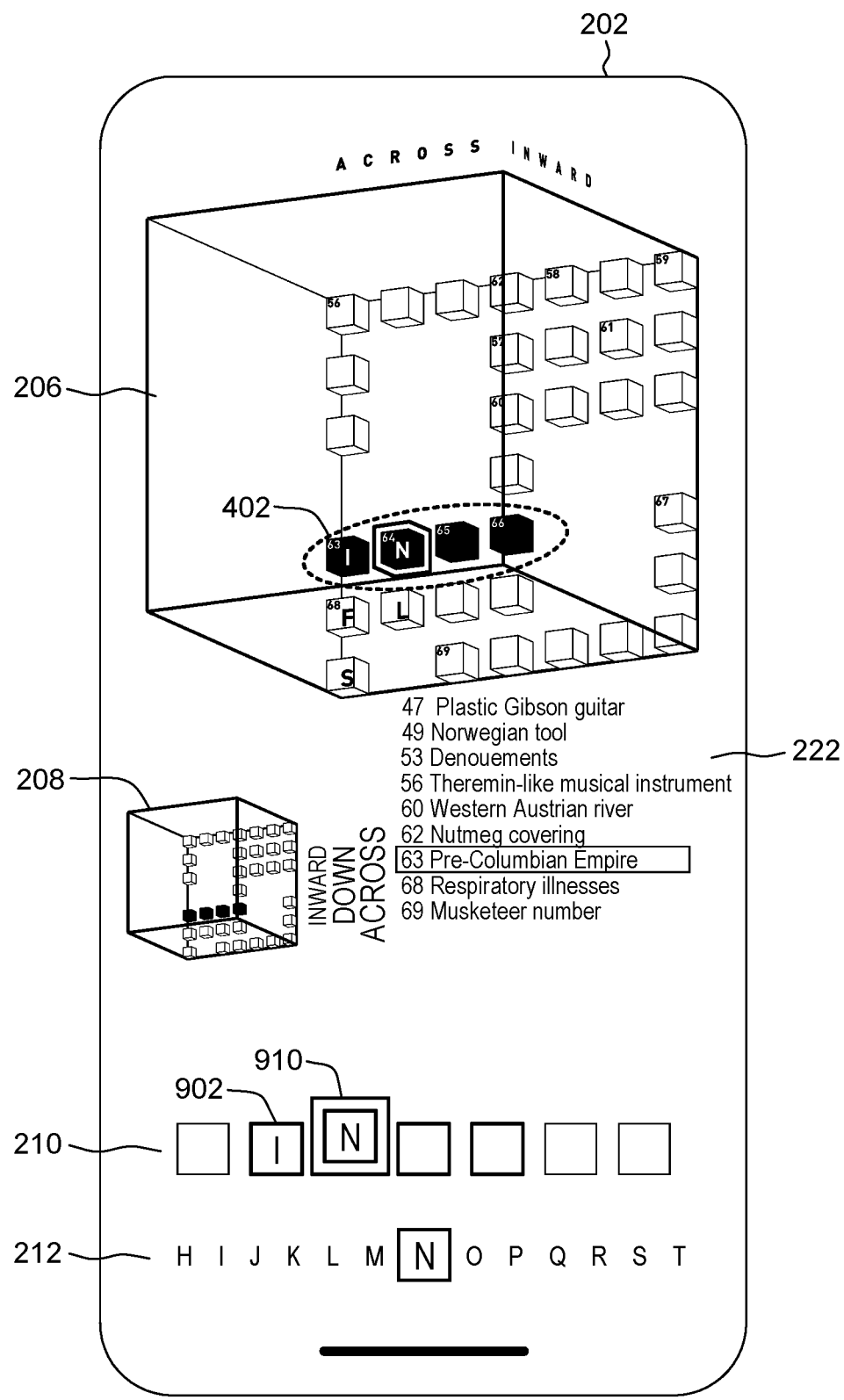

FIGS. 9A and 9B illustrate the process of placing letters in a word builder 210 according to some present aspects. More specifically, FIG. 9A illustrates how a user may place letters into the selected word 402 corresponding to the highlighted clue in the active clue list 222. In an aspect, the word builder 210 may include a plurality of letter boxes 902. Each letter box 902 may represent a particular letter in the selected word 402. Since the selected word 402 contains four letters, the processor 104 may automatically highlight four letter boxes 902 and may dim back the remaining letter boxes in the word builder 210.

In an aspect, a user may input letters into the highlighted letter boxes within the word builder 210 using the letter selector 212. In an aspect, the letter selector 212 may contain all letters of a particular alphabet, presented sequentially, for example. In an aspect, the alphabet may be a Latin alphabet. Examples of Latin-alphabet based languages include, but are not limited to, English, German, Dutch, Danish, Swedish, Norwegian, French, Spanish, Portuguese, Italian, etc. However, aspects of the present disclosure are not limited to Latin-based alphabet languages and may work with any other language that may be used for creation of crossword puzzles.

In an aspect, a user may touch the letter selector 212 and may navigate the letter selector 212 by moving the list of letters either left or right to place the desired letter into a letter highlighter 904. In an aspect, once a desired letter is found, a user may press and hold 906 the letter highlighter 904 and may move 908 the highlighted letter to the desired letter box 910 within the word builder 210 as shown in FIG. 9A.

In an aspect, in response to detecting the move 908 from the letter selector 212 to the word builder 210, the processor 104 may dynamically display the selected letter in the desired letter box 910, as shown in FIG. 9B. In an aspect, the processor 104 may highlight the desired letter box 910 by color coding it, for example. In addition to updating the word builder 210, the processor 104 may simultaneously place the selected letter into a corresponding position within the selected word 402 of the display cube 206. In an aspect, the processor 104 may dynamically highlight (for example, by color coding) the newly placed letter within the selected word 402 to draw user's attention to the active play. Advantageously, the word builder 210 may act as a proxy of the selected word 402 of the display cube 206. In other words, the processor 104 may employ the word builder 210 to simplify the process of placing desired letters into the 3D display cube 206 by performing substantially simultaneous updates of the word builder 210 and the corresponding selected word 402 within the display cube 206.

In summary, FIGS. 2A-9B illustrate user interaction with the game software executed by the processor 104 of the computing device 106. In an aspect, a user may interact with the game software during game play via interface interaction objects and events, such as, but not limited to touches, swipes, and the like, detected by the touch screen 202. As noted above, layouts of the interface interaction objects may be essentially the same on a touchscreen and in virtual and augmented reality environments. In some aspects, interaction with game software may be performed using other input devices, such as, but not limited to, keyboard 112 and mouse 114.

In an aspect, the game software executed by the processor 104 may provide a creator mode in addition to a play mode. FIGS. 2A-9B illustrated interaction with the game software executed in the game mode by the processor 104. FIGS. 10A-13 bellow illustrate interaction with the game software executed in the creator mode.

Figure 10A:
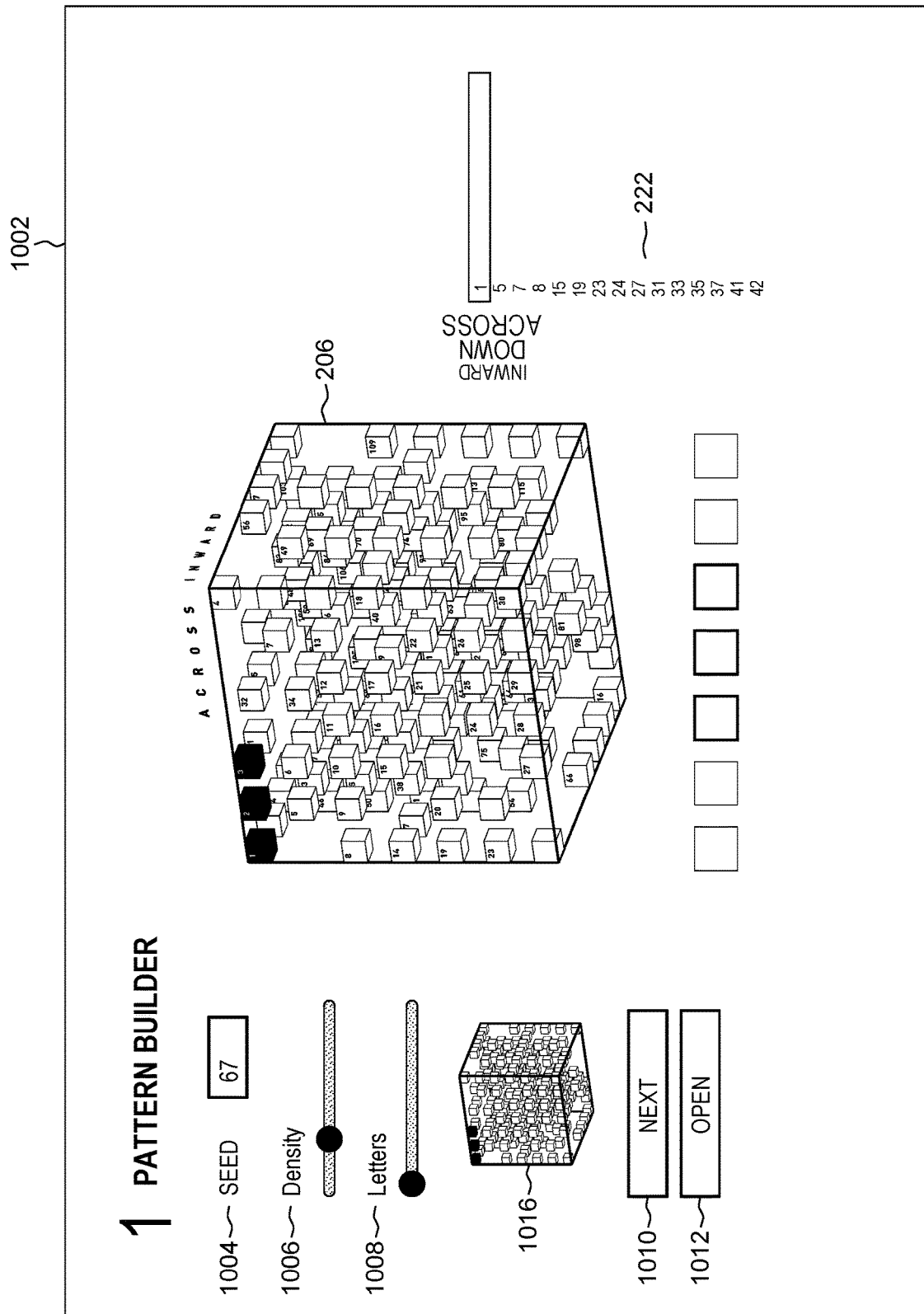
FIGS. 10A-10C illustrates different modes for generating a crossword pattern using a dynamic pattern generator according to some present aspects.
Figure 10B:
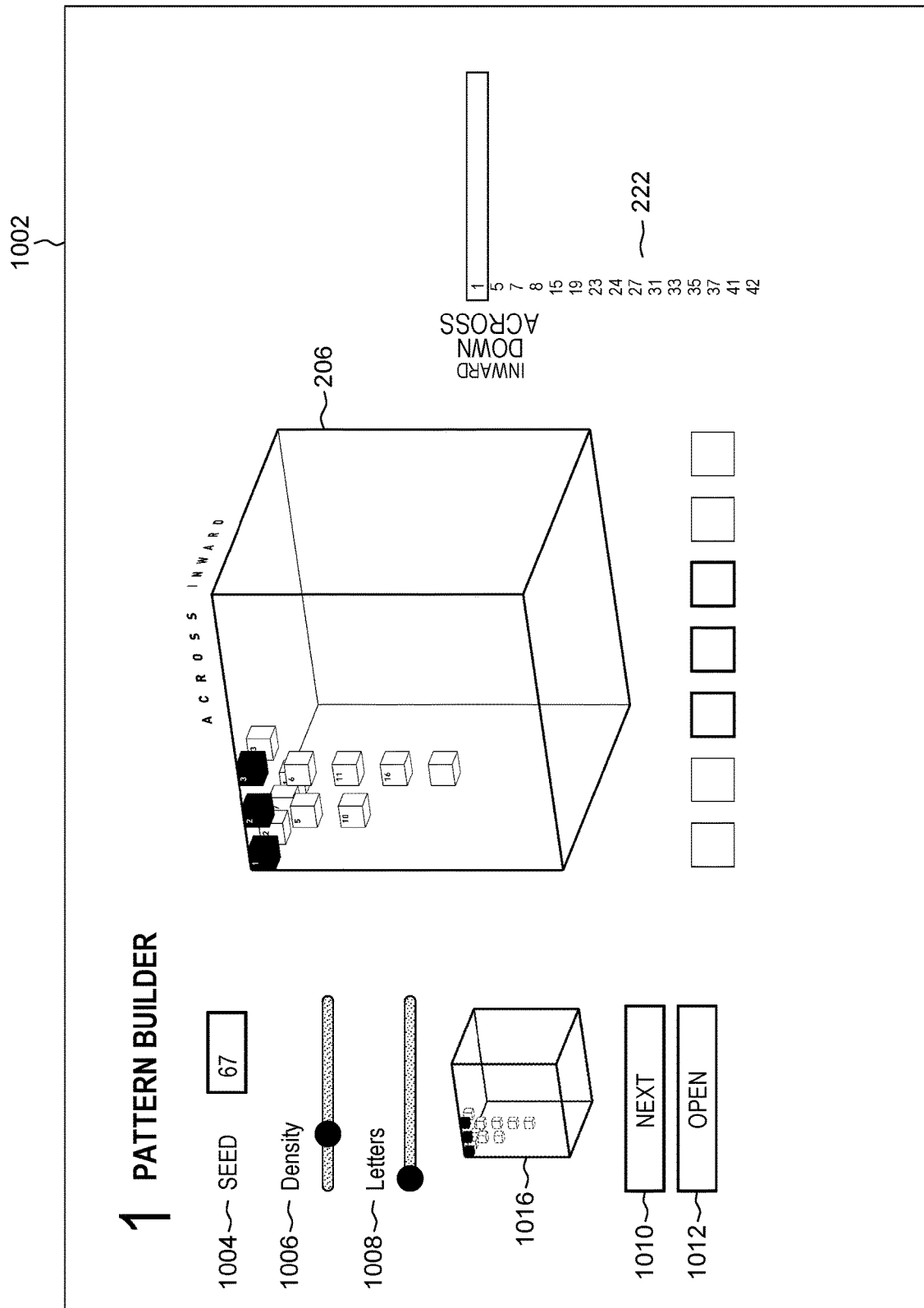
Figure 10C:
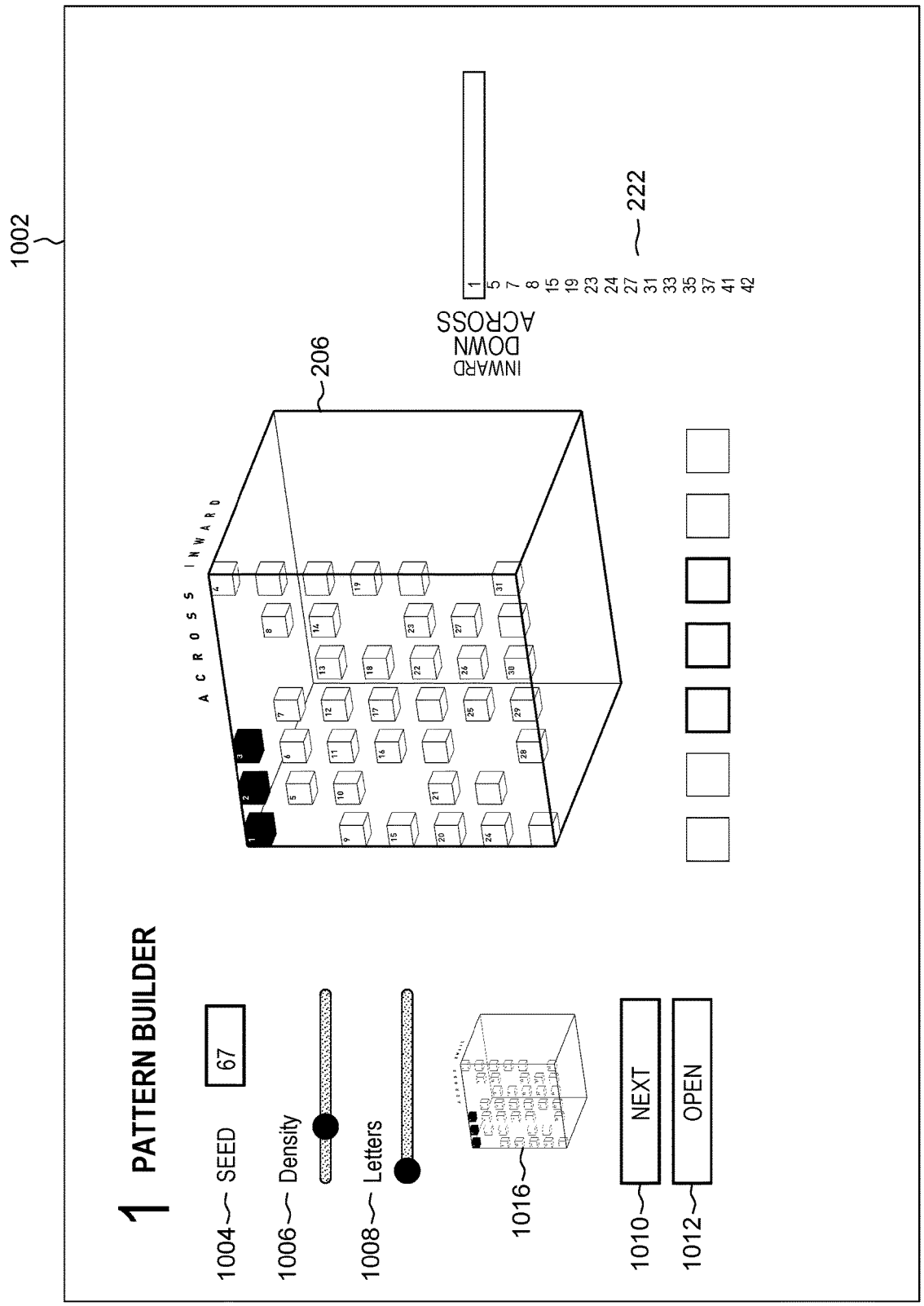

More specifically, FIG. 10A illustrates an interactive user interface of a dynamic pattern generator. In an aspect, in the creator mode, the processor 104 may render the interactive user interface 1002 shown in FIG. 10A. In an aspect, the interactive user interface 1002 may include a plurality of interface components that enable a user to input parameters that are used by the pattern generator to generate a unique puzzle pattern of the display cube 206. In an aspect, the generated pattern may be diagonally symmetrical in all three dimensions.

In an aspect, the plurality of components of the interactive user interface 1002 may include a plurality of UI controls 1004-1012 for manipulating the generation of the display cube 206, including generation of a dynamic pattern.

In FIG. 10A, a first UI control 1004 may enable users to input unique numbers (seeds) for a random pattern generator. All random number generators (RNG) require an input seed number or seed number set to initialize the random number generation algorithm. The RNG seed is typically an integer used to initialize the starting point for generating the series of random numbers produced by the RNG. The seed initializes the generator to a random starting point, and each unique seed returns a unique random number sequence. Typically, a seed number is introduced to the RNG which initializes the RNG and the resulting output is a sequence of unpredictable numbers that are further used by the processor 104 for pattern generation purposes. In an aspect, the processor 104 may use the seed entered into the first UI control 1004 as an identifier of the pattern that is generated using the corresponding pseudorandom sequence. In an aspect, a second UI control 1006 may enable users to configure how many crossword puzzle words should be included in the display cube 206. In an aspect, a third UI control 1008 may enable users to configure a number of letters shown in the plurality of input tiles 220. In an aspect, the third UI control 1008 may include a slider to select how many letters should be placed in the input tiles 220. The selection may range from no letters positioned in any of the input tiles (e.g., corresponding to leftmost position of the slider) to all input tiles 220 being filled with letters (e.g., corresponding to rightmost position of the slider). It should be noted that unlike the first UI control 1004 and the second UI control 1006 the value selected by the third UI control 1008 does not alter the pattern generated by the processor. In an aspect, the processor may simply fill in none, some, or all of the input tiles of a pattern with random letters, based on the value of the third UI control 1008. Advantageously, the third UI control 1008 may give the user a sense of the pattern with at least some letters visible, even at the start of the puzzle cube generation process.

In an aspect, the processor 104 may dynamically update the display cube 206 in response to user's manipulation of any of the UI controls 1004-1012. It should be noted that the second UI control 1006 may also include sliders that enable users to select a value of corresponding parameter ranging from 0 to 100, for example.

In an aspect, the processor 104 may generate numbers 1014 for crossword puzzle words contained in the display cube 206 and for corresponding clues in the clue list 222. In an aspect, the number generation algorithm employed by the processor 104 may iterate through all the tiles starting from the top left position and continuing along the across direction 808 of the crossword puzzle left to right and top to bottom before going to the next layer along the inward direction of the crossword puzzle. In an aspect, the processor 104 may analyze each tile to determine if it comprises a first tile of a crossword puzzle word. In other words, the processor 104 may determine if the analyzed tile is a first tile in a sequence of tiles going in any of the three directions. If so, the processor 104 may assign the next available number to the analyzed tile. In an aspect, the number assignment process may start with 1 for the first tile requiring a number may be continued by increasing that number for each subsequent tile requiring a number (i.e., the tile representing first letter of the corresponding crossword puzzle word). It should be noted, at this stage only numbers 1014 may be included in the clue list 222 and the display cube 206. In an aspect, the processor 104 may render the generated numbers 1014 in a top corner of each crossword puzzle word's first tile.

For the purposes of the present discussion, the game software may include software functionality that may be any function, capability, or feature, e.g., stored or arranged data, that is provided via computer code, i.e., software. Generally, software functionality may be accessible via use of a UI and accompanying UI controls and features. Software functionality may include actions, such as retrieving data pertaining to a computing object (e.g., display cube 206); performing a game-related task, such as calculating position of the display cube 206, performing searches, and so on.

In an aspect, the processor 104 may enable a user to rotate the display cube 206 around the vertical axis at any time while creating a configuration of the display cube 206 and/or may enable a user to perform tilt up/tilt down operations, as described above in conjunction with FIGS. 2A-2B.

In an aspect, once a user is satisfied with an appearance of the display cube 206, the user may press a first button control 1010. In an aspect, in response to users pressing the first button control 1010, the processor 104 may dynamically generate the pattern for display cube 206 to be used in the play mode of the game software. The pattern may be generated based on the parameter values provided using the UI controls 1004-1006. In one non-limiting example, the processor 104 may start the pattern generation process with a completely filled quadrant (quarter) of the display cube 206. For example, if the display cube 206 is generated using X, Y, Z coordinate axes, and if the entire display cube 206 is viewed as being 1 unit in each of X, Y and Z directions, the filled quadrant of the display cube 206 would have 1 unit completely filled in the X direction and 0.5 units being filled in the Y and Z directions. Next, the processor may use the seed provided by the first UI control 1004 to remove several tiles from the filled quadrant of the display cube 206 in certain columns. For example, a column of tiles might be removed by the processor 104 that included the first, second and third tiles on a row that starts on the second position on the X axis and the third position on the Y axis from the edge of the display cube 206 and going in the vertical direction. In an aspect, the processor 104 may determine how many of such columns should be removed in each direction from the filled quadrant of the display cube 206 based on the combination of the seed and density parameters, provided by the first UI control 1004 and the second UI control 1006, respectively. In addition, the processor 104 may analyze the remaining tiles to make sure that each remaining tile has a neighbor (i.e., a part of the sequence of tiles representing one crossword puzzle word). All single tiles may be removed by the processor 104 as well. In an aspect, as a first step of pattern generation, the processor 104 may generate corresponding mirror images in the remaining quadrants of the display cube 206. Finally the quadrant is mirrored and flipped twice to form a complete cube that has a diagonal symmetry. As noted above, the pattern generated using the algorithm described above may be diagonally symmetrical in all three dimensions (X,Y,Z directions).

In an aspect, if a user is interested in loading a previously created pattern of the display cube 206, the user may press a second button control 1012. In an aspect, in response to user's pressing the second button control 1012, the processor 104 may dynamically load an interactive menu (not shown) enabling the user to select the pattern for display cube 206 to be loaded.

Furthermore, the user interface 1002 may include a Display Cube Mode Selector (DCMS) icon 1016. The DCMS icon 1016 is similar to the DCMS icon 208 shown in FIGS. 2A and 2B, for example. By tapping the DCMS icon 1016, a user may be able to switch between different viewing modes. In an aspect, a first viewing mode may render all potential input tiles 220 (shown in FIG. 10A). A second viewing mode may render only the selected word and all words that intersect the selected word (shown in FIG. 10B). In an aspect, a third viewing mode may render a slice of a particular surface of a 3D display cube 206 and may render all the words included in the displayed slice (shown in FIG. 10C).

Figure 11:
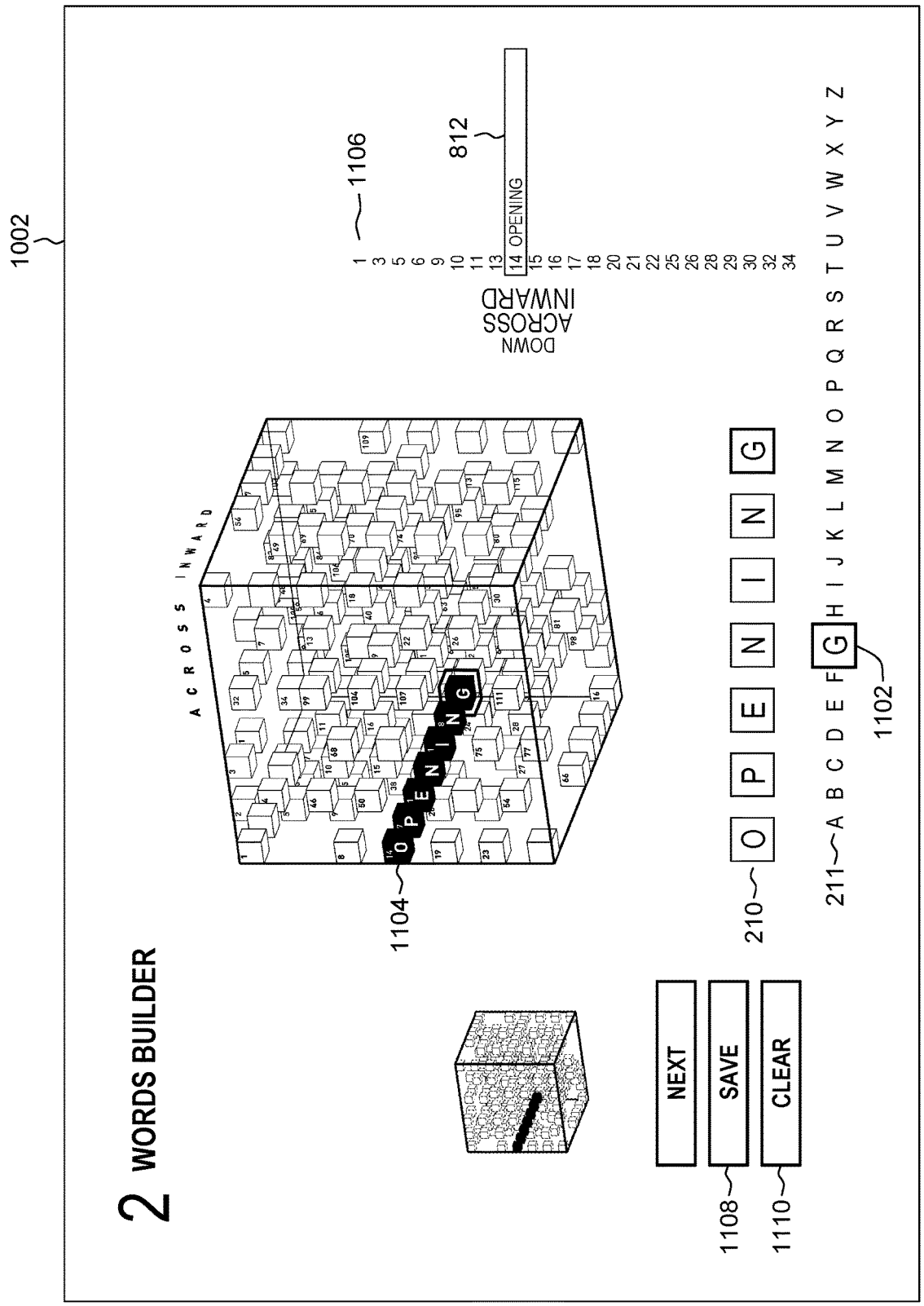
FIGS. 11-13 illustrate a word builder component of the module for generating a crossword cube game according to some present aspects.
Figure 12:
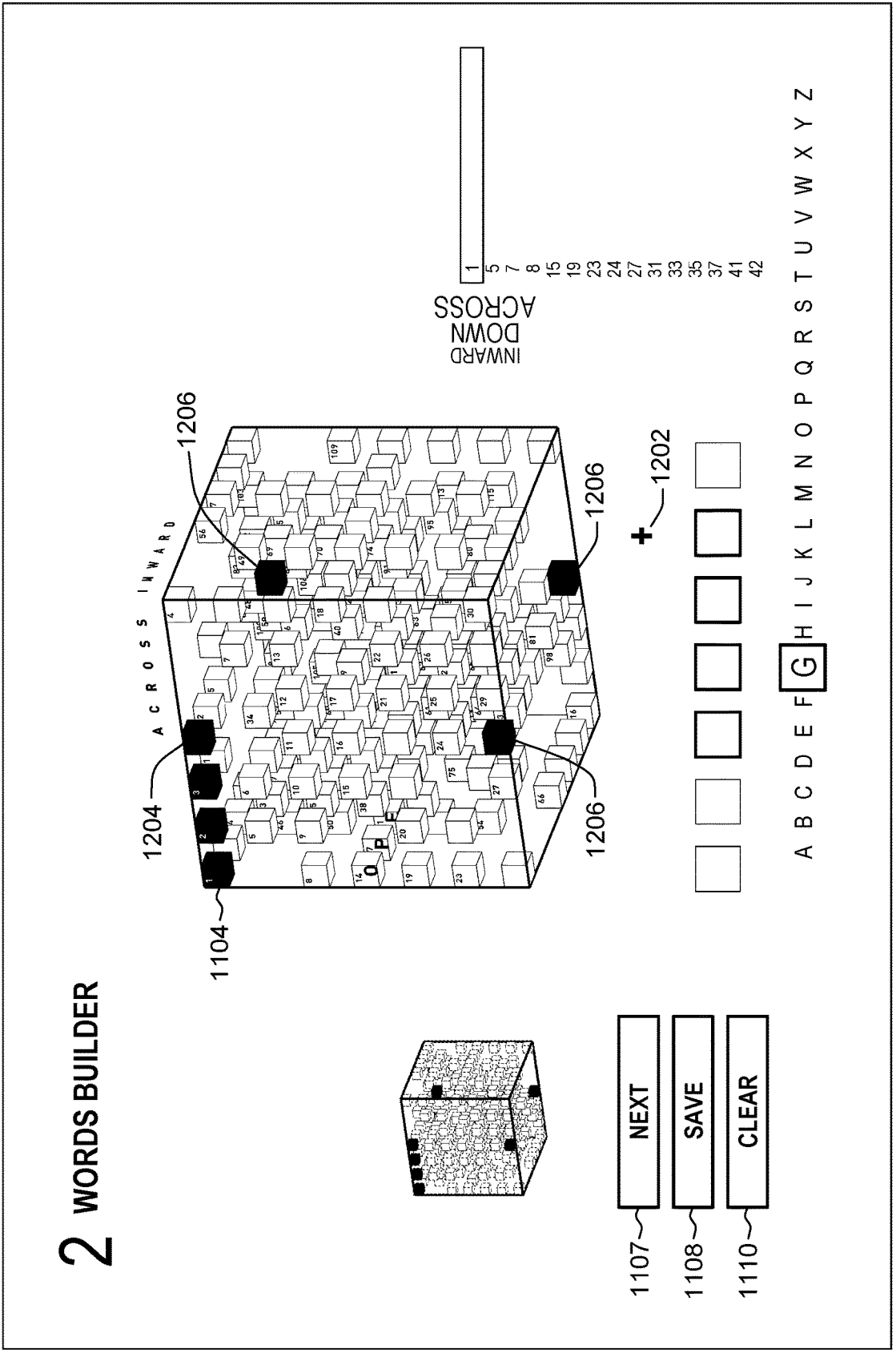
Figure 13:
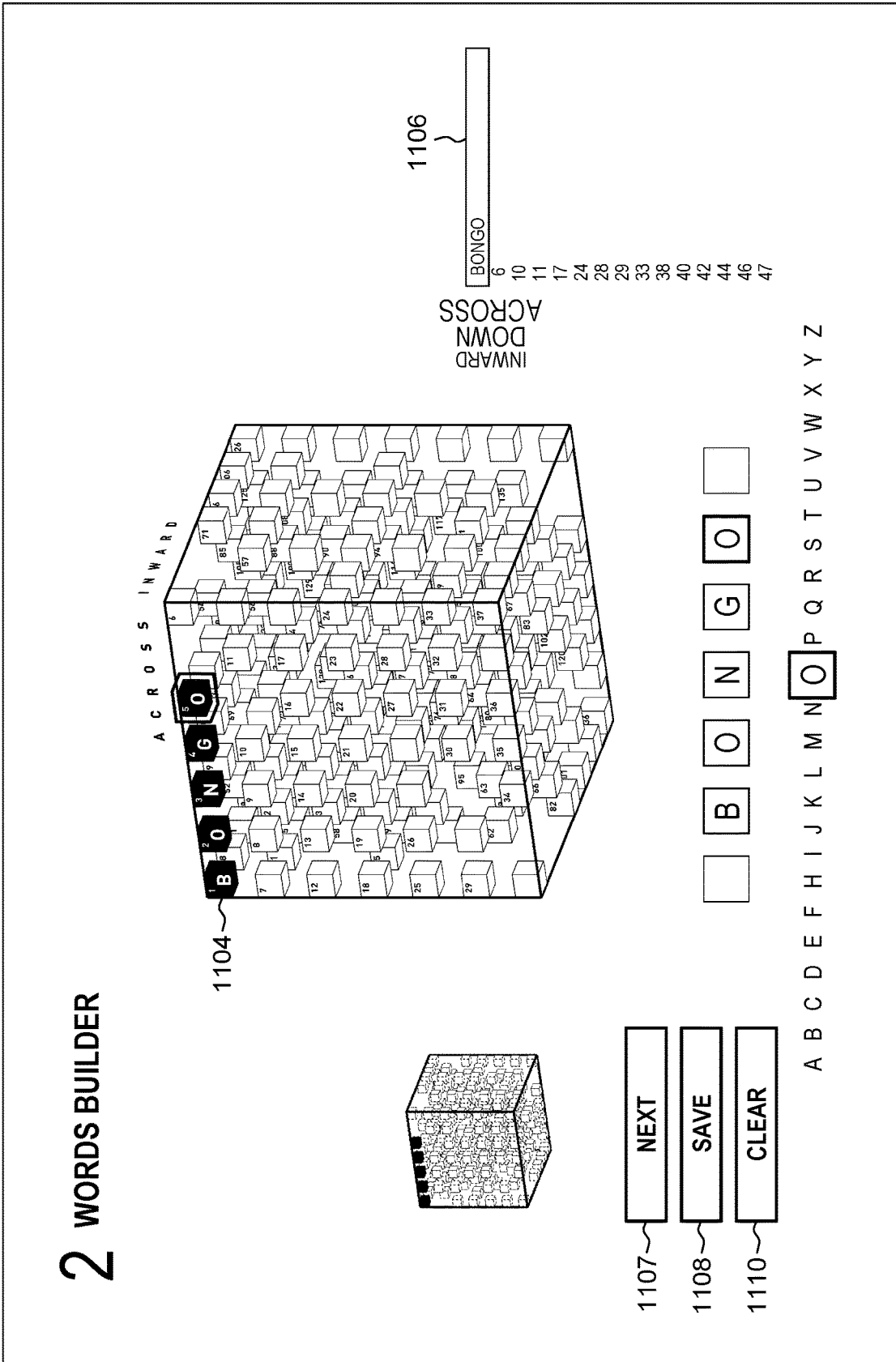

FIGS. 11-13 illustrate a word builder component of the module for generating a crossword cube game according to some present aspects. In an aspect, the interactive user interface 1002 may include a plurality of UI controls 1108-1114 for generating a plurality of crossword puzzle words within the display cube 206 and corresponding words in a word list 1106.

After generating a crossword pattern, as described above, a user may start creating corresponding crossword puzzle words using a word builder 210 and a letter selector 212. In an aspect, a user may input letters into the highlighted letter boxes within the word builder 210 using the letter selector 212. In an aspect, the letter selector 212 may contain all letters of a particular alphabet, presented sequentially, for example.

In an aspect, in response to detecting a move from the letter selector 212 to the word builder 210, the processor 104 may automatically display the letter selected via the desired letter box 1102 in the word builder 210, as shown in FIG. 11. In addition to updating the word builder 210, the processor 104 may simultaneously place the selected letter into a corresponding position within the created word 1104 of the display cube 206 in real time.

In an aspect, a user may repeat the steps described above to move letters from the letter selector 212 to the corresponding positions within the word builder 210. Once again, in addition to updating the word builder 210, the processor 104 may simultaneously place the selected letter into a corresponding position within the created word 1104 of the display cube 206 until the entire word is complete.

In an aspect, in response to determining that all letter positions within the word builder 210 had been completed, the processor may dynamically add the created word to the word list 1106.

In an aspect, in response to a user pressing a second button control 1108, the processor 104 may save the word entered into the word builder 210 in the computing device's memory 102. In response to a user pressing a third button control 1110, the processor 104 may reset (clear) the word entered into the word builder 210.

Furthermore, as shown in FIG. 11, the user interface 1002 may include the DCMS icon 1016 described above. As shown in FIG. 11, a user may select another word from the word list 1106 by touching the highlight rectangle 812 and moving the word list 1106 up or down to place the desired word into the highlight rectangle 812. Advantageously, a user may switch the directions of the clue list 222 by swiping two fingers, as described above in conjunction with FIG. 8A.

FIG. 12 illustrates optional functionality that may enable users to add additional letter positions to the word builder 210. For example, if a user is working on a three letter word, but wants to add another letter at the end, the user may press a plus sign icon 1202 in the word builder 210. In response to detecting that a user pressed the plus sign icon 1202, the processor 104 may dynamically add additional tile 1204 to the created word 1104. As noted above, the generated pattern may be diagonally symmetrical. Therefore, in aspect, in response to adding the additional tile 1204 to the created word 1104, the processor 104 may also add diagonally symmetrical tiles 1206 to the pattern shown in FIG. 12.

FIG. 13 illustrates that after a user enters letters to the created word 1104, the created word is also added to the word list 1106 by the processor 104.

In an aspect, after all words are added to the word list 1106, a user may transition to the next stage of the display cube generation by pressing a first button control 1107.

Figure 14:
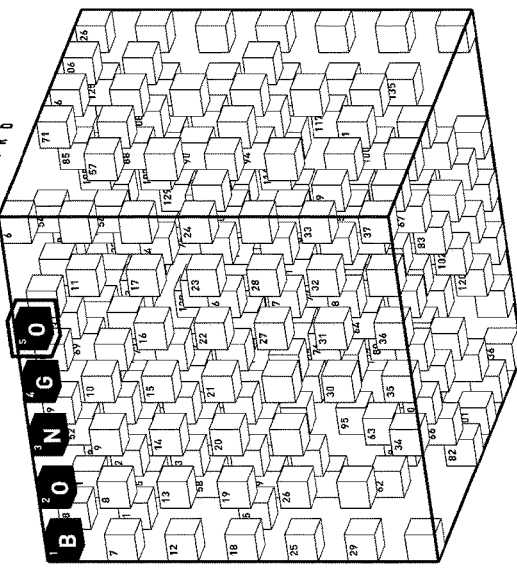
FIG. 14 illustrates a clue builder component of the module for generating a crossword cube game according to some present aspects.
Figure 14:
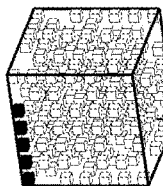
Figure 14:
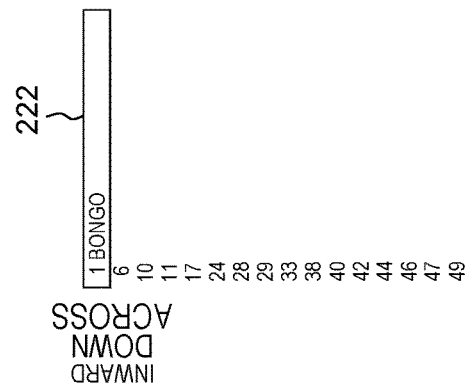
Figure 14:
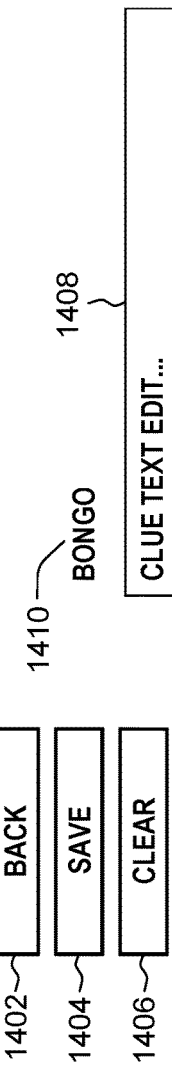

In an aspect, at the last stage, in the view illustrated in FIG. 14, the interactive user interface 1002 may include a text field 1408. The text field 1408 may be used by users to enter text of the clue selected from the clue list 222. In an aspect, a corresponding word 1410 for which the clue is created may also be rendered by the processor 104, for example, above the text field 1408, or within the text field 1408 before users enter text of the clue. In an aspect, in response to a user pressing enter after entering the clue text into the text field 1408, the processor 104 may dynamically place the newly entered clue into the clue list 222. In an aspect, a user may enter text into the text field 1408 using keyboard 112 and mouse 114, for example.

As shown in FIG. 14, the interactive user interface 1002 may further include a first button control 1402, a second button control 1404, and a third button control 1406. In response to a user pressing the first button control 1402, the processor 104 may transition user back to the previous stage (word creation) of the display cube generation. In an aspect, in response to a user pressing the third button control 1406, the processor 104 may reset (clear) the clue entered into the text field 1408. In response to a user pressing the second button control 1404, the processor 104 may save the clue text entered in the text field 1408 in the computing device's memory 102. In an aspect, saving all the clues may complete the game generation process. In an aspect, at the last stage, the processor 104 may publish the newly generated game. In an aspect, the processor 104 may generate a file that can contain information about the generated 3D display cube. In addition, the file may be sent to a remote server for storage and publishing purposes.

The aforementioned operations are presented by way of example as a subset of possible operations for generation of an interactive three dimensional (3D) game, although aspects of the present disclosure are not so limited. For example, any combination of operations usable in interaction with a 3D model can be implemented as described herein. As a non-limiting example, the display cube 206 may be used to render a 3D chemical structure, such as, but not limited to three-dimensional DNA nanostructure. In an aspect, the interactive user interface 1002 shown in FIG. 10A may include a plurality of interface components that enable a user to input parameters that are used by the pattern generator to generate a unique nanostructure pattern on the display cube 206. By tapping the DCMS icon 1016, as described above, a user may be able to switch between different viewing modes of the generated nanostructure pattern.

As another non-limiting example, captured data consisting of photorealistic images combined with optional 3D depth information can provide a basis for utilizing the display cube 206 for generating reconstructed digital 3D space models, such as a reconstructed digital 3D model of an architectural building, including detailed interior and exterior features of the building. Digital 3D models reconstructed in this way can be edited and conditioned in a creator mode described above in conjunction with FIGS. 10A-14. This creator mode may allow users, for example, to interact with the 3D model to obtain distance measurements, define preferred viewing locations, modify the appearance of the model, augment or remove features of the 3D model, and the like. The resulting published 3D space model can be experienced by an audience, using a viewing device such as a computer display, a mobile device, a virtual reality (VR) headset or an augmented reality (AR) device, when operated in a play mode.

Figure 15:
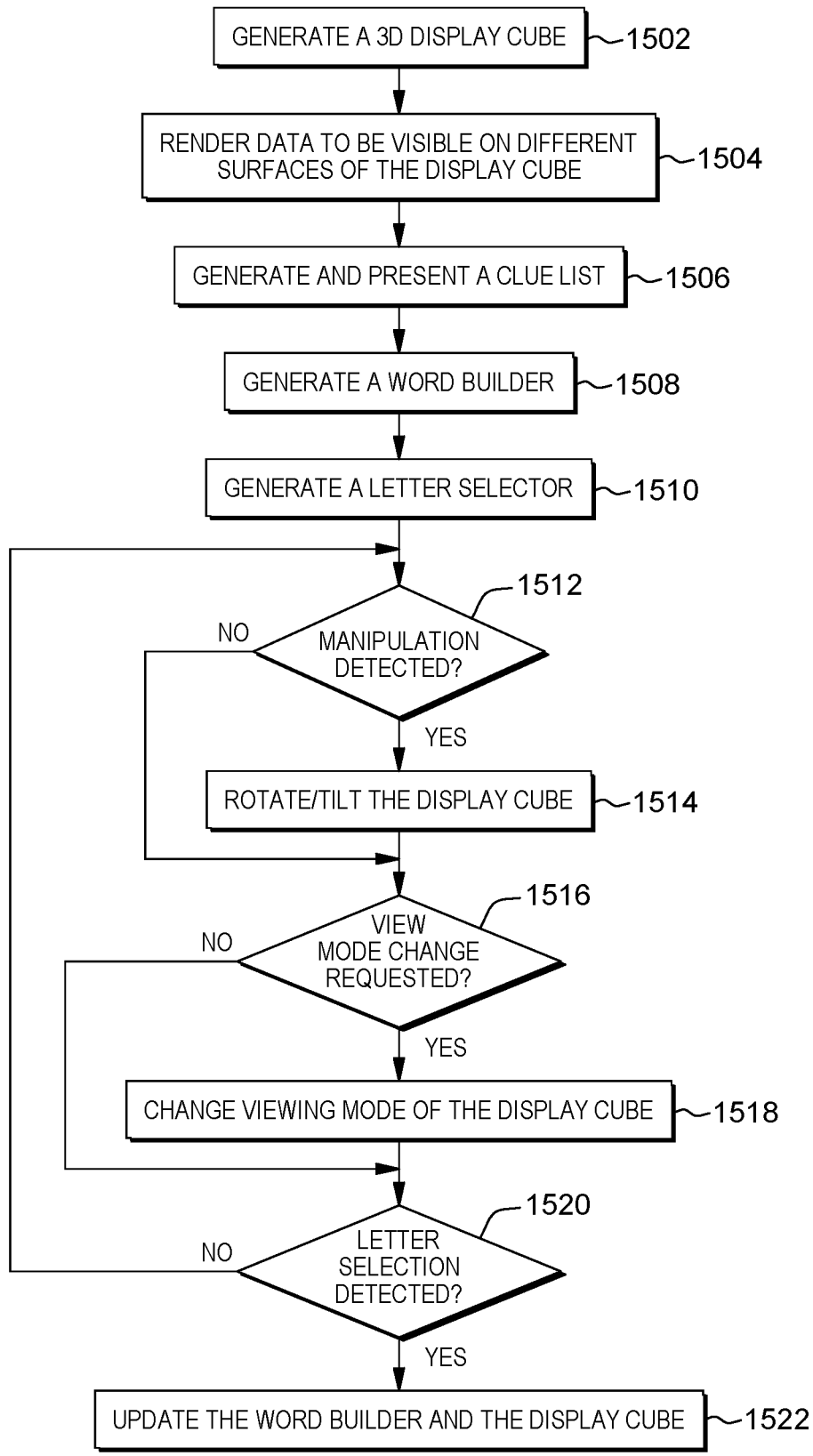
FIG. 15 is a flowchart of an example method for generating an interactive three dimensional (3D) game, in accordance with aspects of the present disclosure.

FIG. 15 is a flowchart of an example method for generating an interactive three dimensional (3D) game, in accordance with aspects of the present disclosure. FIGS. 1-14 may be referenced in combination with the flowchart of FIG. 15.

At 1502, the processor 104 may generate a display cube 206. In an aspect, the display cube 206 permits the game to be played and manipulated in three dimensions by allowing the player to manipulate the display cube to expose the respective faces during play of the game or solving of the puzzle. The virtual 3D display cube 206 includes a plurality of surfaces. Each of the plurality of surfaces has a unique play surface associated with the 3D game and may include various combinations of the input tiles 220 that represent various word positions of the crossword puzzle. By rotating the view of the display cube 206, a user may get a better sense of a three dimensional position of each word within the display cube 206.

At 1504, the processor 104 may render data to be visible on different surfaces of the display cube 206. For example, the processor 104 may render letters and/or numbers associated with particular tiles that were created using the creator mode, as described above in conjunction with FIGS. 11-14

At 1506, the processor 104 may generate and present a clue list 222. As shown in FIG. 7A, a user may move the clue list 222 to another word position by touching 702 the highlight rectangle 704 and moving it up 706 or down along the y-axis of the display cube 206. In an aspect, the clues included in the clue list 222 may be color coded by the processor 104. Advantageously, a user may switch the directions of the clue list 222 by swiping two fingers. Such touches 802 and 804 of two fingers are shown in FIG. 8A.

In an aspect, at 1508, the processor 104 may generate a word builder 210. In an aspect, the word builder 210 may include a plurality of letter boxes 902 as shown in FIG. 9A, for example.

At 1510, the processor 104 may generate a letter selector 212. In an aspect, a user may touch the letter selector 212 and may navigate the letter selector 212 by moving a letter highlighter 904 either right or left through the corresponding alphabet. In an aspect, the letter selector 212 may contain all letters of a particular alphabet, presented sequentially, for example.

At 1512, the processor 104 may determine if the manipulation of the display cube 206 is detected. In response to determining that the display cube 206 manipulation is detected (decision block 1512, "Yes" branch), at 1514, the processor 104 may dynamically rotate the display cube 206 and/or dynamically tilt the display cube 206 based on user's manipulation input. It should be noted that when the display cube 206 is rotated all of the input tiles 220 are rotated accordingly as well to match the rotation of the display cube 206. In an aspect, the processor 104 may enable a user to rotate the display cube 206 around the vertical axis at any time while creating a configuration of the display cube 206 and/or may enable a user to perform tilt up/tilt down operations, as described above in conjunction with FIGS. 2A and 2B, for example. In an aspect, in response to user's double tap operation, the processor 104 may dynamically zoom in the display cube 206 to a closer view. In response to determining that the display cube 206 manipulation is not detected (decision block 1512, "No" branch), the processor 104 may proceed to 1516.

At 1516, the processor 104 may determine if a view mode change was requested by a user. In response to determining that the view mode change detected (decision block 1516, "Yes" branch), at 1518, the processor 104 may dynamically switch game viewing modes. In an aspect, a user may switch between a plurality of game viewing modes by tapping on the DCMS icon 208. In an aspect, a first viewing mode may render all potential input tiles 220. In an aspect, the processor 104 may generate a geometry buffer for storing the x, y, z values of each input tile 220. A second viewing mode may render only the selected word and all words that intersect the selected word. In an aspect, a third viewing mode may render a slice of a particular surface of a 3D display cube 206 and may render all the words included in the displayed slice. In response to determining that the view mode change is not detected (decision block 1516, "No" branch), the processor 104 may proceed to 1520.

At 1520, the processor 104 may determine if a letter selection/movement is detected. In response to determining that the letter selection is detected (e.g. in response to detecting the move 908 from the letter selector 212 to the word builder 210) (decision block 1520, "Yes" branch), at 1522, the processor 104 may dynamically display the selected letter in the desired letter box 910, as shown in FIG. 9B. In an aspect, the processor 104 may highlight the desired letter box 1014 by color coding it, for example. In addition to updating the word builder 210, the processor 104 may simultaneously place the selected letter into a corresponding position within the selected word 402 of the display cube 206.

The disclosed approach provides game software configured to generate a 3D playable and movable crossword puzzle rendered in a display cube and having an interactive interface adapted for touch screen devices. In an aspect, the display cube is easily rotatable and tiltable to provide best viewing 3D angle for a user. The disclosed approach provides rotational limits to prevent any information from being presented backwards and/or from being stacked up. Advantageously, the disclosed approach enables user to tilt the display cube up or down to obtain optimum viewing angle as well. As yet another advantage, the disclosed interactive user interface enables users to switch between at least three different viewing modes.

In other words, one aspect a method of generating an interactive three dimensional (3D) game includes generating a manipulable volumetric virtual 3D display cube. The manipulable volumetric virtual 3D display cube includes a plurality of cubic elements. Display data is generated to depict within the plurality of cubic elements of the manipulable volumetric virtual 3D display cube. The manipulable volumetric virtual 3D display cube is rotated along a vertical axis, in response to a first user input, to view the display data from different angles. A view of the manipulable volumetric virtual 3D display cube is changed, in response to a second user input.

In one or any combination of these aspects, the interactive 3D game includes a 3D puzzle game. The manipulable volumetric virtual 3D display cube includes a plurality of cubic elements that includes a plurality of input tiles. The plurality of cubic elements are arranged in a plurality of figures with the same face designation constituting a plurality of puzzles having independent solutions.

In one or any combination of these aspects, a second object is generated for navigating a list of puzzle clues. Clues in the list are color coded to indicate level of completion for a corresponding puzzle.

In one or any combination of these aspects, a third object is generated for building words comprising solutions for corresponding puzzles. The third object is configured to display one or more letters within a word in response to user input. The third object is configured to display the word corresponding to the puzzle clue highlighted in the list of puzzle clues. The manipulable volumetric virtual 3D display cube is updated to display the word rendered by the third object in response to the user input.

In one or any combination of these aspects, a fourth object is generated that is configured to display a plurality of alphabet letters. The third object is configured to display the letter selected by the user in the fourth object.

In one or any combination of these aspects, generating the display data includes generating the display data using a first module configured to generate a unique dynamic display cube pattern based on a plurality of parameters. The display cube pattern includes the plurality of puzzles having independent solutions.

In one or any combination of these aspects, the generated unique dynamic display cube pattern includes a diagonally symmetrical pattern.

In one or any combination of these aspects, the list of puzzle clues is generated using a second module. The generated puzzle clues are displayed by the second object. The virtual 3D display cube is dynamically updated to display a puzzle word corresponding to the generated puzzle clues.

Figure 16:
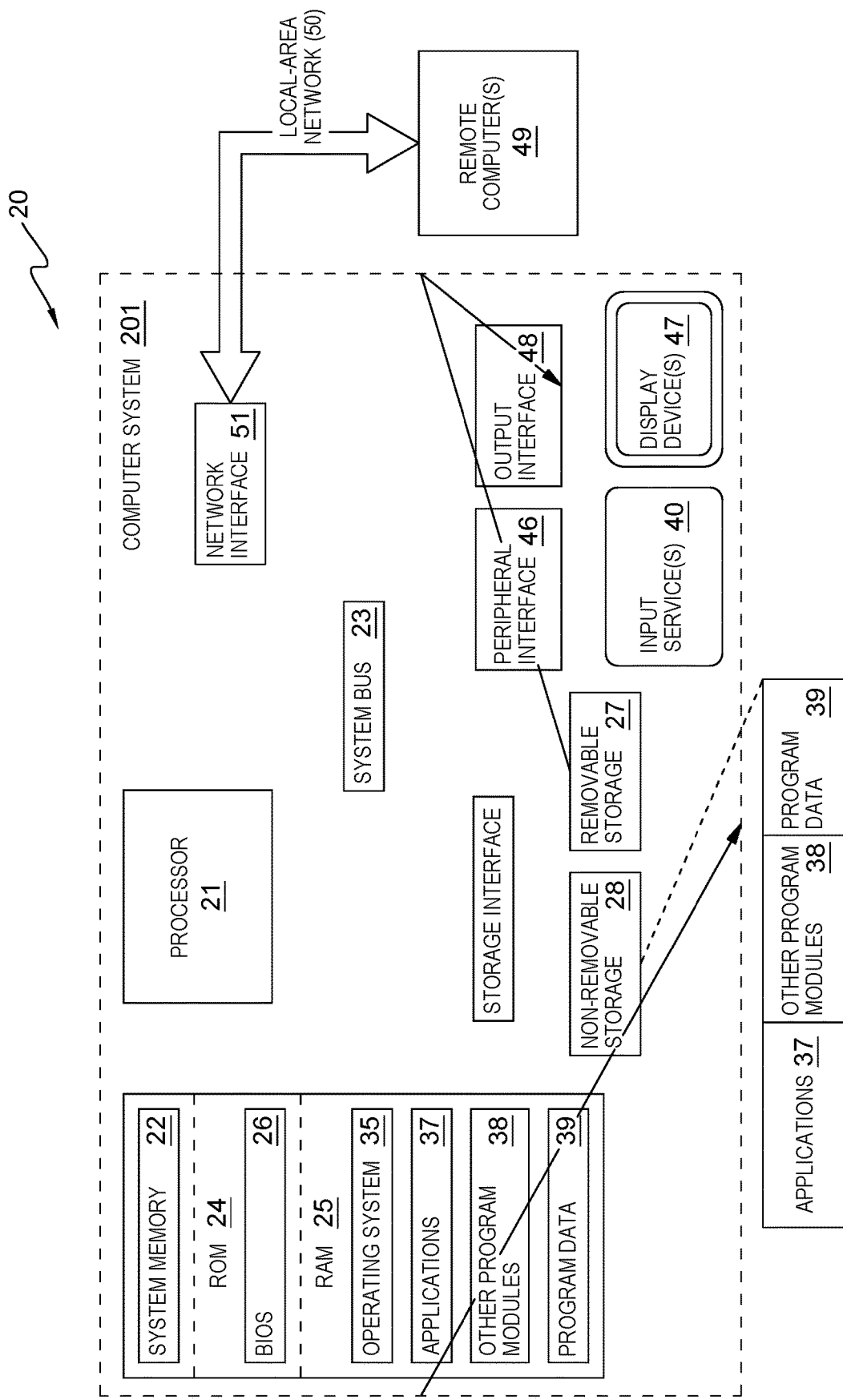
FIG. 16 is a block diagram of various hardware components and other features of an example computer hosting game software in accordance with aspects of the present disclosure

FIG. 16 shows an example of a computer system on which variant aspects of systems and methods disclosed herein may be implemented. The computer system 20 may represent the host computing device 106 shown in FIG. 1 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such

What is claimed is:

1. A method for generating and manipulating an interactive three dimensional (3D) data object, the method comprising:
    displaying a manipulable volumetric virtual 3D display cube formed by a plurality of cubic elements that are configured to display data received from a user input;
    changing a view of the manipulable volumetric virtual 3D display cube, in response to at least one user input, to create parallax in the plurality of cubic elements to adjust a display of at least one cubic element that is interior to the manipulable volumetric virtual 3D display cube and is behind at least one other cubic element that is adjacent to an outer surface of the manipulable volumetric virtual 3D display cube; and
    generating, based on the user input, the display data that is depicted within the at least one cubic element of plurality of cubic elements and that is viewable from behind the at least one other cubic element.

2. The method of claim 1, wherein the manipulable volumetric virtual 3D display cube includes columns and rows of the plurality of cubic elements that extend in X, Y and Z coordinate axes and portion of the plurality of cubic elements are interior to the manipulable volumetric virtual 3D display cube.

3. The method of claim 1, further comprising rotating the manipulable volumetric virtual 3D display cube along at least a vertical axis, in response to the at least one user input, to display at least a portion of the plurality of cubic elements from different angles.

4. The method of claim 1, wherein the manipulable volumetric virtual 3D display cube is configured as a 3D puzzle game and wherein each of the plurality of cubic elements of the manipulable volumetric virtual 3D display cube have a plurality of surfaces that each have a unique play surface to provide different combinations for different solutions of the 3D puzzle game.

5. The method of claim 4, further comprising generating an object for navigating a list of puzzle clues, wherein words in the list are color coded to indicate level of completion for a corresponding puzzle.

6. The method of claim 4, further comprising generating an object for building words comprising solutions for corresponding puzzles, wherein the object is configured to display one or more letters within a word in response to user input, wherein the object is configured to display the word corresponding to the puzzle clue highlighted in the list of puzzle clues, and wherein the manipulable volumetric virtual 3D display cube is updated to display the word rendered by the object in response to the user input.

7. The method of claim 6, further comprising generating an additional object configured to display a plurality of alphabet letters, wherein the object is configured to display the letter selected by the user in the additional object.

8. The method of claim 1, wherein generating the display data further comprises generating the display data using a first module configured to generate a unique dynamic display cube pattern based on a plurality of parameters.

9. A system for generating and manipulating an interactive three dimensional (3D) data object, the system comprising:
    a memory and a processor configured to execute software instructions stored on the memory to:
        display a manipulable volumetric virtual 3D display cube formed by a plurality of cubic elements that are configured to display data received from a user input;
        change a view of the manipulable volumetric virtual 3D display cube, in response to at least one user input, to create parallax in the plurality of cubic elements to adjust a display of at least one cubic element that is interior to the manipulable volumetric virtual 3D display cube and is behind at least one other cubic element that is adjacent to an outer surface of the manipulable volumetric virtual 3D display cube; and
        generate, based on the user input, the display data that is depicted within the at least one cubic element of plurality of cubic elements and that is viewable from behind the at least one other cubic element.

10. The system of claim 9, wherein the manipulable volumetric virtual 3D display cube includes columns and rows of the plurality of cubic elements that extend in X, Y and Z coordinate axes and portion of the plurality of cubic elements are interior to the manipulable volumetric virtual 3D display cube.

11. The system of claim 9, wherein the processor is further configured to execute software instructions stored on the memory to rotate the manipulable volumetric virtual 3D display cube along at least a vertical axis, in response to the at least one user input, to display at least a portion of the plurality of cubic elements from different angles.

12. The system of claim 9, wherein the manipulable volumetric virtual 3D display cube is configured as a 3D puzzle game and wherein each of the plurality of cubic elements of the manipulable volumetric virtual 3D display cube have a plurality of surfaces that each have a unique play surface to provide different combinations for different solutions of the 3D puzzle game.

13. The system of claim 12, wherein the processor is further configured to execute software instructions stored on the memory to generate an object for navigating a list of puzzle clues, wherein words in the list are color coded to indicate level of completion for a corresponding puzzle.

14. The system of claim 12, wherein the processor is further configured to execute software instructions stored on the memory to generate an object for building words comprising solutions for corresponding puzzles, wherein the object is configured to display one or more letters within a word in response to user input, wherein the object is configured to display the word corresponding to the puzzle clue highlighted in the list of puzzle clues, and wherein the manipulable volumetric virtual 3D display cube is updated to display the word rendered by the object in response to the user input.

15. The system of claim 14, wherein the processor is further configured to execute software instructions stored on the memory to generate an additional object configured to display a plurality of alphabet letters, wherein the object is configured to display the letter selected by the user in the additional object.

16. The system of claim 9, wherein the processor is further configured to execute software instructions stored on the memory to generate the display data further comprises generating the display data using a first module configured to generate a unique dynamic display cube pattern based on a plurality of parameters.

17. A non-transitory computer readable medium storing thereon computer executable instructions generating an interactive three dimensional (3D) data object, including instructions for:
    displaying a manipulable volumetric virtual 3D display cube formed by a plurality of cubic elements that are configured to display data received from a user input;
    changing a view of the manipulable volumetric virtual 3D display cube, in response to at least one user input, to create parallax in the plurality of cubic elements to adjust a display of at least one cubic element that is interior to the manipulable volumetric virtual 3D display cube and is behind at least one other cubic element that is adjacent to an outer surface of the manipulable volumetric virtual 3D display cube; and
    generating, based on the user input, the display data that is depicted within the at least one cubic element of plurality of cubic elements and that is viewable from behind the at least one other cubic element.

18. The non-transitory computer readable medium of claim 17, wherein the manipulable volumetric virtual 3D display cube includes columns and rows of the plurality of cubic elements that extend in X, Y and Z coordinate axes and portion of the plurality of cubic elements are interior to the manipulable volumetric virtual 3D display cube.

19. The non-transitory computer readable medium of claim 17, further comprising instructions for rotating the manipulable volumetric virtual 3D display cube along at least a vertical axis, in response to the at least one user input, to display at least a portion of the plurality of cubic elements from different angles.

20. The non-transitory computer readable medium of claim 17, wherein the manipulable volumetric virtual 3D display cube is configured as a 3D puzzle game and wherein each of the plurality of cubic elements of the manipulable volumetric virtual 3D display cube have a plurality of surfaces that each have a unique play surface to provide different combinations for different solutions of the 3D puzzle game.

* * * * *